(12) United States Patent
Kimura

(10) Patent No.: US 9,319,549 B2
(45) Date of Patent: Apr. 19, 2016

(54) INFORMATION PROCESSING SYSTEM, INFORMATION PROCESSING APPARATUS, AND INFORMATION PROCESSING METHOD

(71) Applicant: Takayuki Kimura, Kanagawa (JP)

(72) Inventor: Takayuki Kimura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/636,285

(22) Filed: Mar. 3, 2015

(65) Prior Publication Data

US 2015/0271348 A1   Sep. 24, 2015

(30) Foreign Application Priority Data

Mar. 18, 2014  (JP) ................... 2014-055396
Jan. 13, 2015  (JP) ................... 2015-004250

(51) Int. Cl.
*H04N 1/04* (2006.01)
*H04N 1/00* (2006.01)

(52) U.S. Cl.
CPC ......... *H04N 1/0083* (2013.01); *H04N 1/00204* (2013.01)

(58) Field of Classification Search
CPC ....... G06Q 10/06; G06Q 10/10; G06Q 40/00; G06Q 40/025; G06Q 20/10; G06Q 30/02; G06Q 30/06; G06Q 40/02; G06Q 40/04; G06Q 50/22; G06Q 19/3487; G06Q 19/321; G06Q 19/322; G06Q 3/0481; G06Q 3/04845
USPC ............. 358/1.15, 1.13, 1.18, 1.14, 1.16, 1.1, 358/487; 709/201, 203, 205, 219, 223, 231, 709/246; 399/8
See application file for complete search history.

(56) References Cited

U.S. PATENT DOCUMENTS

| | | | |
|---|---|---|---|
| 8,203,740 B2 | 6/2012 | Yagi | |
| 8,520,230 B2* | 8/2013 | Kato | H04N 1/442 358/1.14 |
| 8,819,780 B2* | 8/2014 | Inose | G06F 21/41 709/227 |
| 8,848,218 B2* | 9/2014 | Kishida | H04N 1/00413 358/1.15 |
| 2009/0055903 A1* | 2/2009 | Inose | G06F 21/41 726/4 |
| 2010/0214600 A1* | 8/2010 | Yagi | 358/1.15 |
| 2011/0023102 A1* | 1/2011 | Ikeda | G06F 21/40 726/7 |
| 2011/0026064 A1* | 2/2011 | Kato | H04N 1/442 358/1.14 |
| 2011/0058216 A1* | 3/2011 | Kishida | H04N 1/00413 358/1.15 |
| 2011/0093447 A1* | 4/2011 | Goto | 707/706 |
| 2013/0215565 A1* | 8/2013 | Nakada et al. | 361/679.09 |
| 2014/0129607 A1* | 5/2014 | Nagumo | H04L 67/02 709/201 |

(Continued)

FOREIGN PATENT DOCUMENTS

| | | |
|---|---|---|
| JP | 2009-177231 | 8/2009 |
| JP | 2013-251703 | 12/2013 |
| JP | 2013-255027 | 12/2013 |

*Primary Examiner* — Negussie Worku
(74) *Attorney, Agent, or Firm* — IPUSA, PLLC

(57) ABSTRACT

An information processing apparatus is provided that includes a first selection unit configured to select a workflow for executing at least one process with respect to data; an acquisition unit configured to acquire from a terminal, which includes an access function for accessing a storage service, authentication information used by the terminal upon using the storage service; and an instruction unit configured to instruct an execution of a communication process of exchanging the data with the storage service using the authentication information acquired by the acquisition unit in a case where the workflow selected by the first selection unit includes the communication process.

16 Claims, 21 Drawing Sheets

(56) References Cited

U.S. PATENT DOCUMENTS

| | | | |
|---|---|---|---|
| 2014/0207932 A1* | 7/2014 | Hyo | 709/223 |
| 2015/0040187 A1* | 2/2015 | Fujii | H04L 63/08 726/3 |
| 2015/0040189 A1* | 2/2015 | Fujii | H04L 63/08 726/3 |
| 2015/0081757 A1* | 3/2015 | Yagi | 709/201 |

* cited by examiner

| KEY IDENTIFIER | DESCRIPTION |
|---|---|
| 1 | ACQUISITION REQUEST FOR ACQUIRING AUTHENTICATION INFORMATION FOR USING CLOUD SERVICE A |
| 2 | ACQUISITION REQUEST FOR ACQUIRING AUTHENTICATION INFORMATION FOR USING CLOUD SERVICE B |
| 3 | ACQUISITION REQUEST FOR ACQUIRING AUTHENTICATION INFORMATION FOR USING CLOUD SERVICE C |

FIG.12

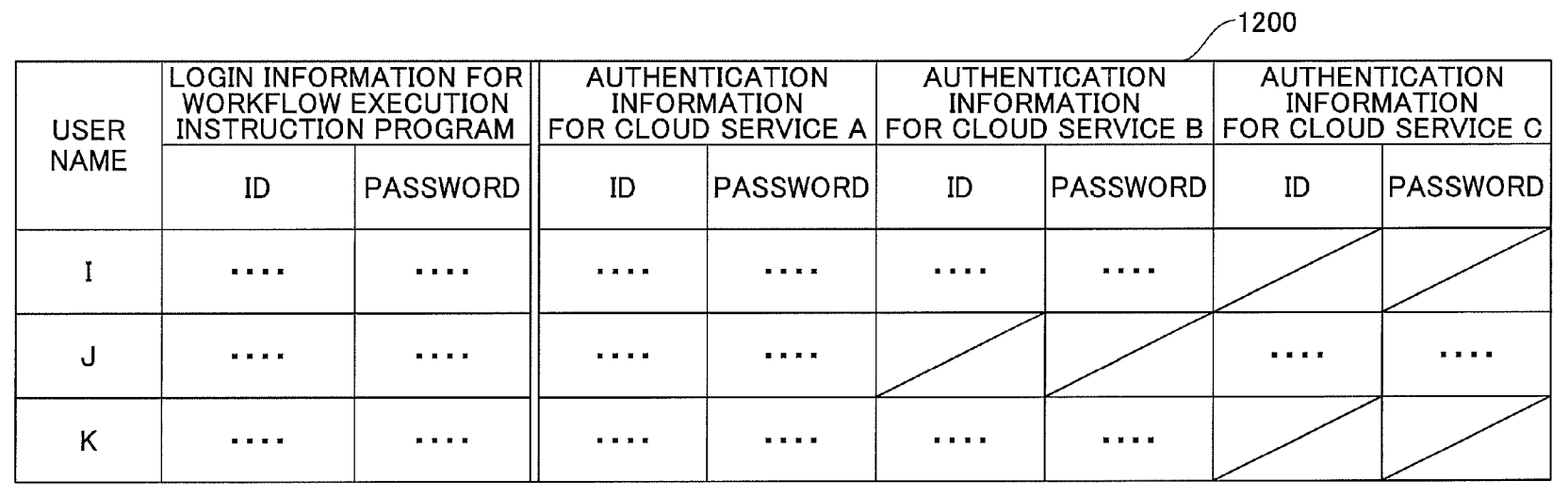

| USER NAME | LOGIN INFORMATION FOR WORKFLOW EXECUTION INSTRUCTION PROGRAM | | AUTHENTICATION INFORMATION FOR CLOUD SERVICE A | | AUTHENTICATION INFORMATION FOR CLOUD SERVICE B | | AUTHENTICATION INFORMATION FOR CLOUD SERVICE C | |
|---|---|---|---|---|---|---|---|---|
| | ID | PASSWORD | ID | PASSWORD | ID | PASSWORD | ID | PASSWORD |
| I | ... | ... | ... | ... | | | | |
| J | ... | ... | ... | ... | | | ... | ... |
| K | ... | ... | ... | ... | ... | ... | | |

1200

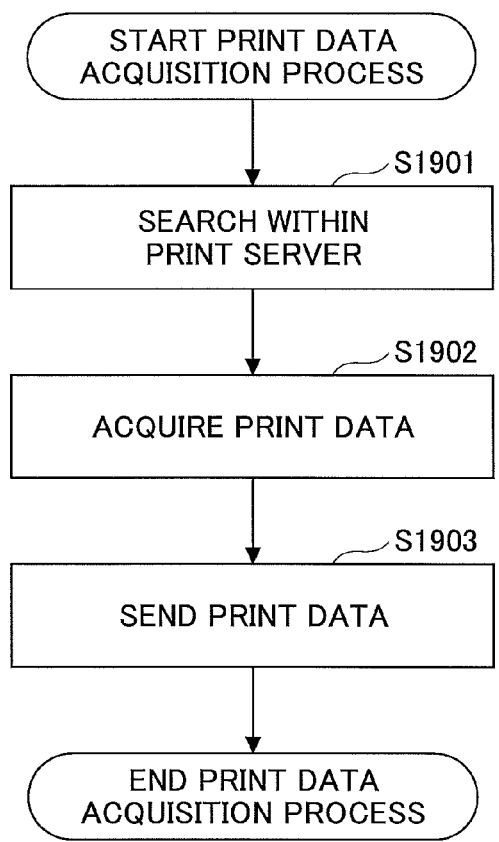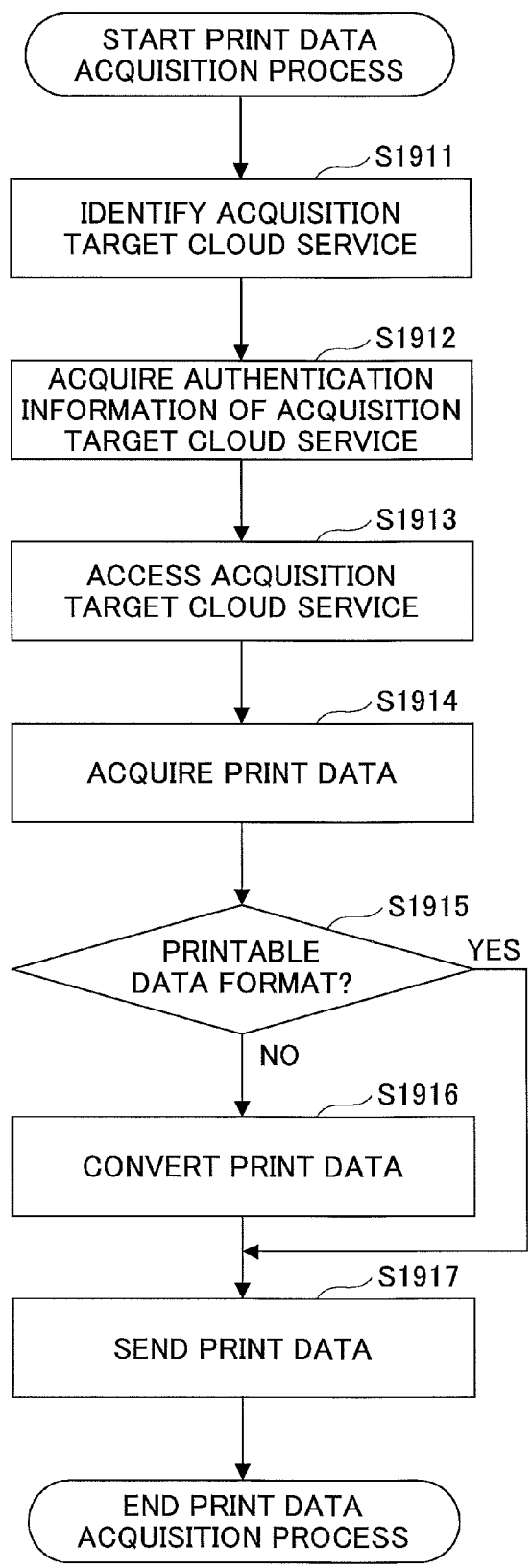

INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method.

2. Description of the Related Art

Delivery systems that combine an image processing apparatus such as a scanner apparatus and a delivery server are known (see e.g. Japanese Laid-Open Patent Publication No. 2009-177231).

In such delivery systems, a scanned image scanned at a scanner apparatus may be delivered to a desired delivery destination by having a delivery server execute a workflow file.

Also, print systems that combine an image processing apparatus such as a printer apparatus and a print server are known. In such print systems, print data acquired from a desired acquisition source may be printed out at a printer apparatus by having a print server execute a workflow file.

Further, in recent delivery systems and print systems (such systems collectively being referred to as "information processing system" hereinafter), a cloud service may be selected as a delivery destination of a scanned image or an acquisition source of print data, for example.

However, in order to enable a cloud service to be selected as a delivery destination or an acquisition source, information such as authentication information for using the cloud service has to be set up in the workflow file. On the other hand, requiring a user to manually input setting information such as authentication information at an image processing apparatus each time the user is to issue a delivery instruction or an acquisition instruction may be an inconvenience to the user.

SUMMARY OF THE INVENTION

In view of the above, an aspect of the present invention relates to improving user convenience in an information processing system.

According to one embodiment of the present invention, an information processing apparatus is provided that includes a first selection unit configured to select a workflow for executing at least one process with respect to data; an acquisition unit configured to acquire from a terminal, which includes an access function for accessing a storage service, authentication information used by the terminal upon using the storage service; and an instruction unit configured to instruct an execution of a communication process of exchanging the data with the storage service using the authentication information acquired by the acquisition unit in a case where the workflow selected by the first selection unit includes the communication process.

BRIEF DESCRIPTION OF THE DRAWINGS

FIG. 12 illustrates an exemplary configuration of authentication information stored in an authentication server;

FIGS. 19A and 19B are flowcharts illustrating exemplary print data acquisition processes;

DESCRIPTION OF THE PREFERRED EMBODIMENTS

In the following, embodiments of the present invention are described with reference to the accompanying drawings. Note that in the following descriptions and accompanying drawing, elements having substantially identical functional features are given the same reference numbers and overlapping descriptions thereof may be omitted.

[First Embodiment]

<Overall Configuration of Delivery System>

Figure 1:
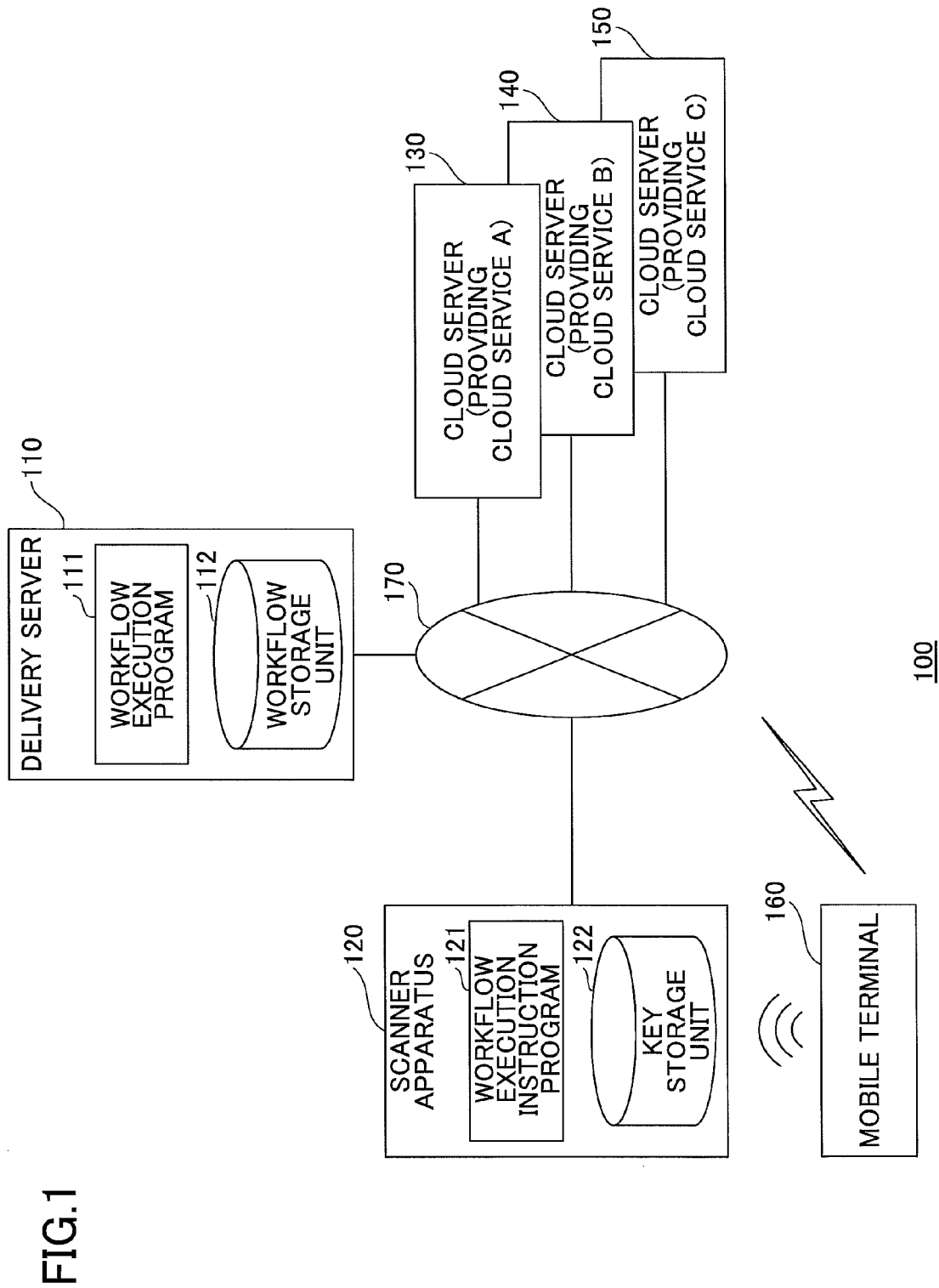
FIG. 1 illustrates an exemplary overall configuration of a delivery system according to a first embodiment of the present invention.

In the following, an overall configuration of a delivery system as an example of an information processing system according to an embodiment of the present invention is described. FIG. 1 illustrates an exemplary configuration of a delivery system 100 according to a first embodiment of the present invention.

In FIG. 1, the delivery system 100 includes a delivery server 110, a scanner apparatus 120 corresponding to an example of an image forming apparatus according to the present embodiment, cloud servers 130-150 corresponding to delivery destinations, and a mobile terminal 160. The delivery server 110, the scanner apparatus 120, the cloud servers 130-150, and the mobile terminal 160 are interconnected via a network 170. Note that in FIG. 1, three cloud servers 130-150 are connected to the network 170. However, the number of cloud servers provided in the present embodiment is not limited a particular number.

Also, it is assumed that the scanner apparatus 120 and the mobile terminal 160 are configured to exchange information with each other by near filed communication.

The delivery server 110 includes a workflow execution program 111 and a workflow storage unit 112.

The workflow execution program 111 executes a workflow file selected from one or more workflow files stored in the workflow storage unit 112, the selection being made by a user at the scanner apparatus 120. Note that a workflow file refers to a file that defines a workflow for successively executing one ore more processes on a scanned image sent from the scanner apparatus 120.

By having the workflow execution program 111 execute a workflow file, for example, an image process may be performed on a scanned image sent from the scanner apparatus 120, and the resulting processed image may be delivered to one of the cloud servers 130-150.

The workflow storage unit 112 stores one or more workflow files.

The scanner apparatus 120 generates a scanned image by scanning a document. The scanner apparatus 120 includes a workflow execution instruction program 121 and a key storage unit 122.

The workflow execution instruction program 121 selects a workflow file to be executed to perform processes on a scanned image, and sets up relevant information necessary to execute the selected workflow file. Also, the workflow execution instruction program 121 outputs an execution instruction to the delivery server 110 to have the selected workflow file executed based on the setting information.

The key storage unit 122 stores key information for acquiring a part of information that is necessary for executing a workflow file through near field communication with the mobile terminal 160.

The cloud servers 130-150 are server apparatuses (service providing apparatuses) that provide cloud services as an example of a storage service. Specifically, the cloud server 130 provides a cloud service A, the cloud server 140 provides a cloud service B, and the cloud server 150 provides a cloud service C. Note that the term "storage service" used herein refers to any general service that provides a function of storing data to a user and is not limited to a service that only provides a storage function to a user.

Note that in order to access the cloud servers 130-150 to use the cloud services A-C, predetermined authentication information has to be sent to the cloud servers 130-150. Thus, for example, when the delivery server 110 delivers a scanned image to any one of the cloud servers 130-150 as a delivery destination, predetermined authentication information has to be sent to the cloud server corresponding to the delivery destination.

The mobile terminal 160 includes an access function for accessing one or more of the cloud servers 130-150 via a network 170. In the present embodiment, it is assumed that the mobile terminal 160 has the authentication information for accessing the cloud servers 130 and 140 of the cloud server 130-150 to use the cloud services A and B.

Also, the mobile terminal 160 establishes near field communication with the scanner apparatus 120 to transmit the authentication information for using the cloud services A and B to the scanner apparatus 120. That is, according to the present embodiment, by merely holding the mobile terminal 160 close to the scanner apparatus 120, the user of the mobile terminal 160 may be able to select the cloud services A and B that can be used by the mobile terminal 160 as delivery destinations for a delivery process implemented by the delivery server 110.

<Hardware Configuration of Delivery Server>

Figure 2:
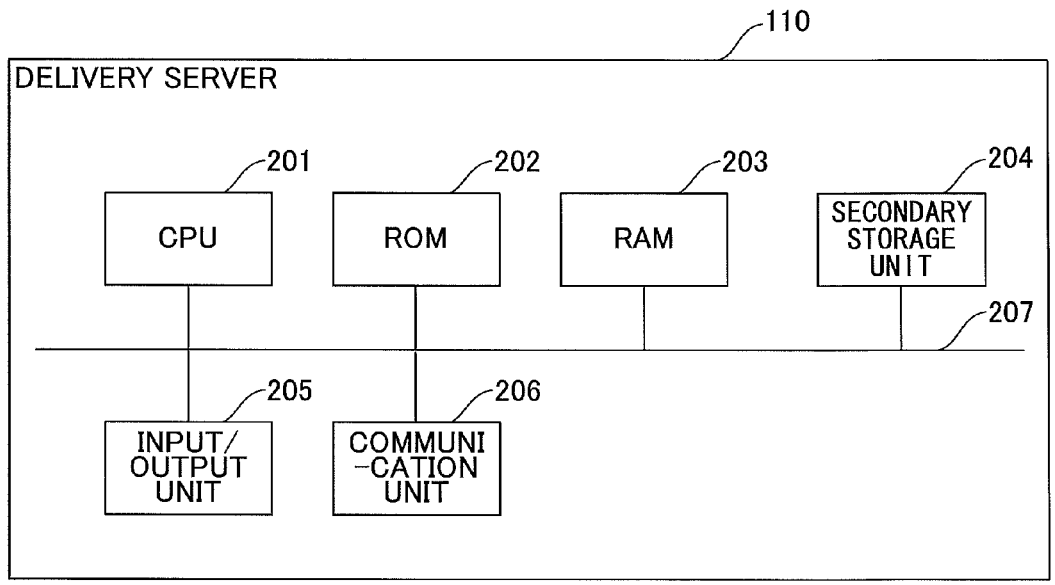
FIG. 2 illustrates an exemplary hardware configuration of a delivery server according to the first embodiment.

In the following, a hardware configuration of the delivery server 110 is described. FIG. 2 is a diagram illustrating an exemplary hardware configuration of the delivery server 110 according to the first embodiment.

In FIG. 2, the delivery server 110 includes a CPU (central processing unit) 201, a ROM (read-only memory) 202, a RAM (random access memory) 203, a secondary storage unit 204, an input/output unit 205, and a communication unit 206. Note that the above hardware components of the delivery server 110 are interconnected via a bus 207.

The CPU 201 is a computer that executes various programs stored in the secondary storage unit 204 (e.g. workflow execution program 111).

The ROM 202 is a non-volatile memory. The ROM 202 stores various programs and data required by the CPU 201 to execute the various programs stored in the secondary storage unit 204. For example, the ROM 202 may store a boot program such as a BIOS (basic input/output system) or an EFI (extensible firmware interface).

The RAM 203 corresponds to a main memory such as a DRAM (dynamic random access memory) or a SRAM (static random access memory). The RAM 203 may function as a work area for loading the various programs that are executed by the CPU 201.

The secondary storage unit 204 stores various programs that may be executed by the CPU 201 (e.g. workflow execution program 111) and storage units that are used upon executing the various programs (e.g. workflow storage unit 112).

The input/output unit 205 includes an input unit for inputting various instructions to the delivery server 110 and a display unit for displaying an internal state of the delivery server 110. The communication unit 206 is configured to receive a workflow execution instruction from the scanner apparatus 120 via the network 170. Also, the communication unit 206 is configured to transmit a scanned image included in the received workflow execution instruction to the cloud servers 130-150.

<Hardware Configuration of Scanner Apparatus>

Figure 3:
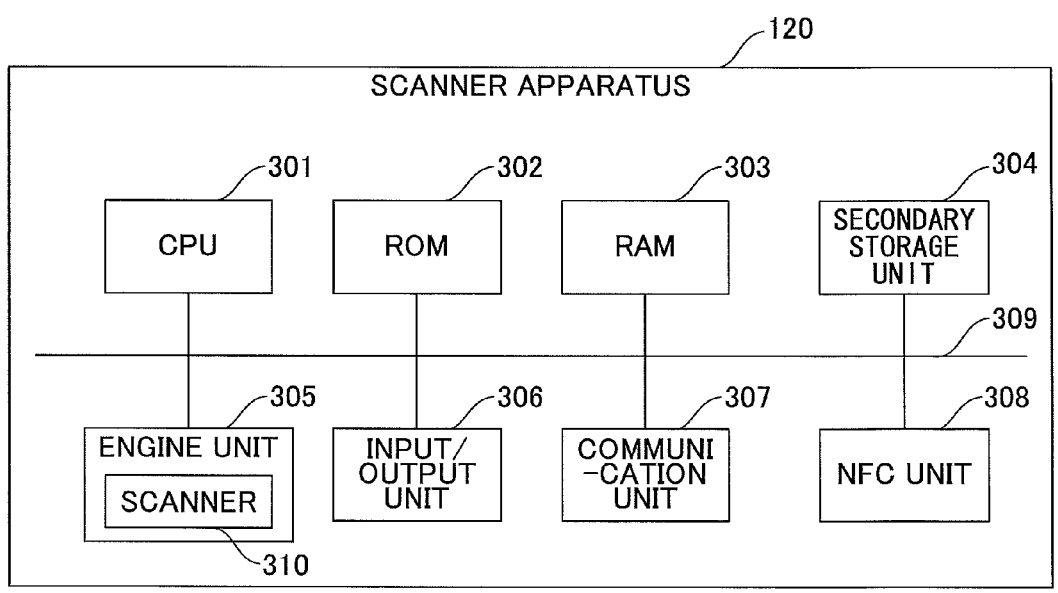
FIG. 3 illustrates an exemplary hardware configuration of a scanner apparatus according to the first embodiment.

In the following, a hardware configuration of the scanner apparatus 120 is described. FIG. 3 is a diagram illustrating an exemplary hardware configuration of the scanner apparatus 120.

In FIG. 3, the scanner apparatus 120 includes a CPU 301, a ROM 302, a RAM 303, a secondary storage unit 304, an engine unit 305, an input/output unit 306, a communication unit 307, and a near field communication (NFC) unit 308. Note that the above hardware components of the scanner apparatus 120 are interconnected via a bus 309.

The CPU 301 is a computer that executes various programs stored in the secondary storage unit 304 (e.g. workflow execution instruction program 121).

The ROM 302 is a nonvolatile memory. The ROM 302 stores various programs and data required by the CPU 301 to execute the various programs stored in the secondary storage unit 304. For example, the ROM 302 may store a boot program such as a BIOS or an EFI.

The RAM 303 is a main memory such as DRAM or a SRAM. The RAM 303 may function as a work area for loading the various programs that are executed by the CPU 301.

The secondary storage unit 304 stores various programs to be executed by the CPU 301 (e.g. workflow execution instruction program 121) and storage units that are used to execute the various programs (e.g. key storage unit 122).

The engine unit 305 includes a scanner 310 and is configured to generate a scanned image by scanning a document.

The input/output unit 306 includes an input unit for inputting various instructions to the scanner apparatus 120 and a display unit, for displaying an internal state of the scanner apparatus 120. The input unit of the scanner apparatus 120 may include an operation button for starting the workflow execution instruction program 121 and operation buttons for inputting various settings during execution of workflow execution instruction program 121, for example. Further, the input unit of the scanner apparatus 120 may include a start button for instructing the execution of a workflow file.

In addition to displaying the internal state of the scanner apparatus 120, the display unit of the scanner apparatus 120 may be configured to display various display screens that are generated during execution of the workflow execution instruction program 121.

The communication unit 307 is configured to transmit a workflow execution instruction to the delivery server 110 via the network 170. The near field communication unit 308 carries is configured to establish near field communication with the mobile terminal 160.

<Information Stored in Delivery Server>

Figure 4:
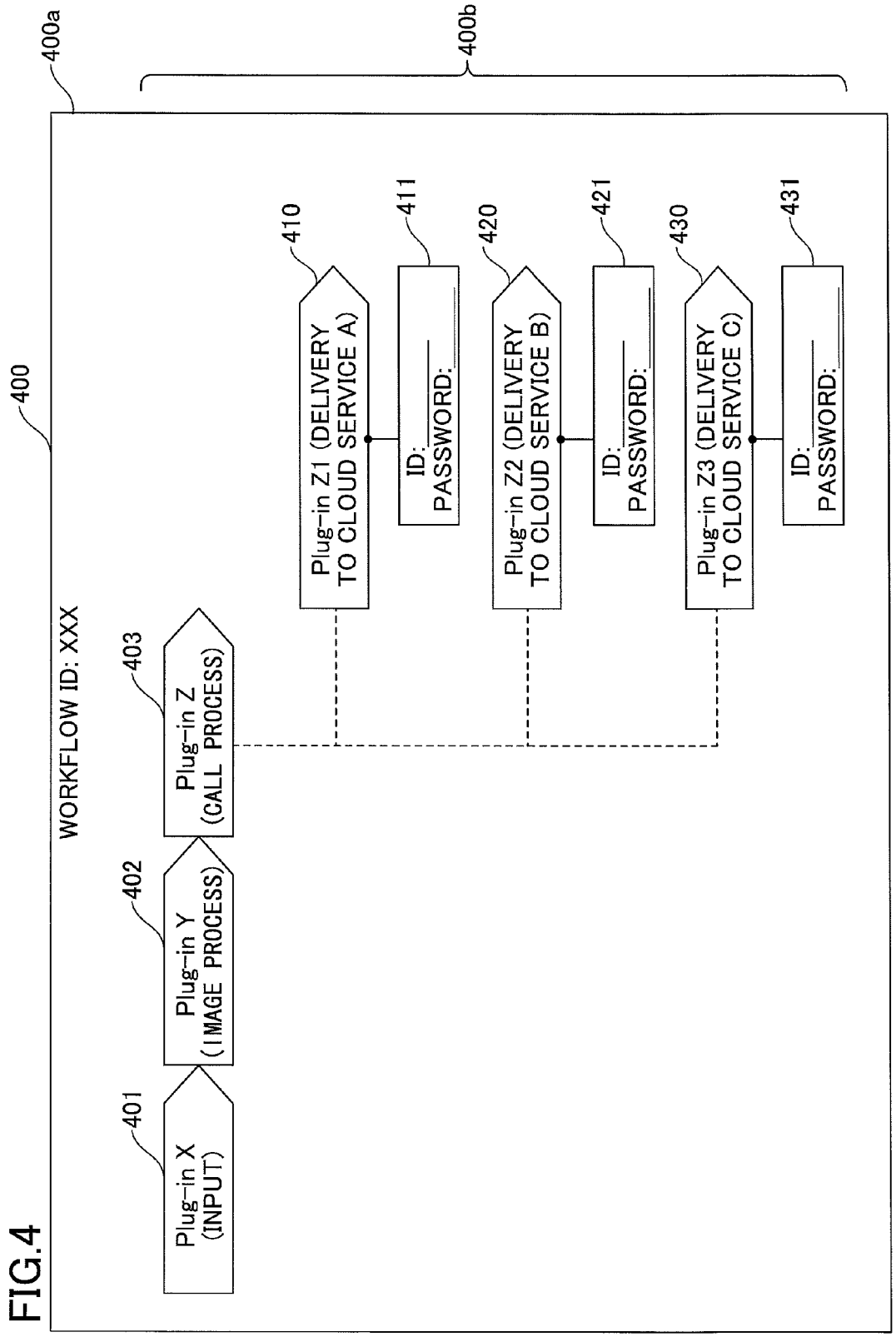
FIG. 4 illustrates an exemplary workflow file according to the first embodiment.

In the following, information stored in the delivery server 110 is described in greater detail. FIG. 4 schematically illustrates an exemplary workflow file 400 stored in the workflow storage unit 112 included in the delivery server 110.

In FIG. 4, the workflow file 400 includes an identifier (workflow ID) 400a that identifies the workflow file 400 and detailed information 400b set up for each plug-in and plug-in group constituting a workflow.

In the example of FIG. 4, the "workflow ID" of the workflow file 400 is labeled as "XXX". Also, the workflow file 400 includes a plug-in 401 labeled "Plug-in X", a plug-in 402 labeled "Plug-in Y", and a plug-in 403 labeled "Plug-in Z". Note, however, that the plug-in 401 labeled "Plug-in X" does not necessarily have to be included in the workflow file 400.

The plug-in 401 labeled "Plug-in X" executes an input process of inputting a scanned image included in a workflow execution instruction sent from the scanner apparatus 120.

The plug-in 402 labeled "Plug-in Y" executes a predetermined image process on the input scanned image. Note that a process executed by the plug-in 402 may include a process other than an image process (e.g. process of embedding metadata into the input scanned image).

The plug-in 403 labeled "Plug-in Z" executes a call process of calling plug-ins 410-430 for executing a delivery process of delivering the processed scanned image.

In the present embodiment, the plug-in 403 labeled "Plug-in Z" is capable of calling a plug-in 410 labeled "Plug-in Z1", a plug-in 420 labeled "Plug-in Z2", and a plug-in 430 labeled "Plug-in Z3".

Note that a determination as to which plug-in of the plug-ins 410-430 is to be called by the plug-in 403 may be made according to the workflow execution instruction sent from the scanner apparatus 120.

The plug-in 410 labeled "Plug-in Z1" executes a delivery process for delivering a scanned image to the cloud service A. Note that authentication information 411 for enabling the plug-in 410 labeled "Plug-in Z1" to use the cloud service A is set up in association with the plug-in 410 labeled "Plug-in Z1".

Similarly, the plug-in 420 labeled "Plug-in Z2" executes a delivery process for delivering a scanned image to the cloud service B. Note that authentication information 421 for enabling the plug-in 420 labeled "Plug-in Z2" to use the cloud service B is set up in association with the plug-in 420 labeled "Plug-in Z2".

Similarly, plug-in 430 labeled "Plug-in Z3" executes a delivery process for delivering a scanned image to the cloud service C. Note that authentication information 431 for enabling the plug-in 430 labeled "Plug-in Z3" to use the cloud service C is set up in association with the plug-in 430 labeled "Plug-in Z3".

<Information Stored in Scanner Apparatus>

Figures 5, 6:
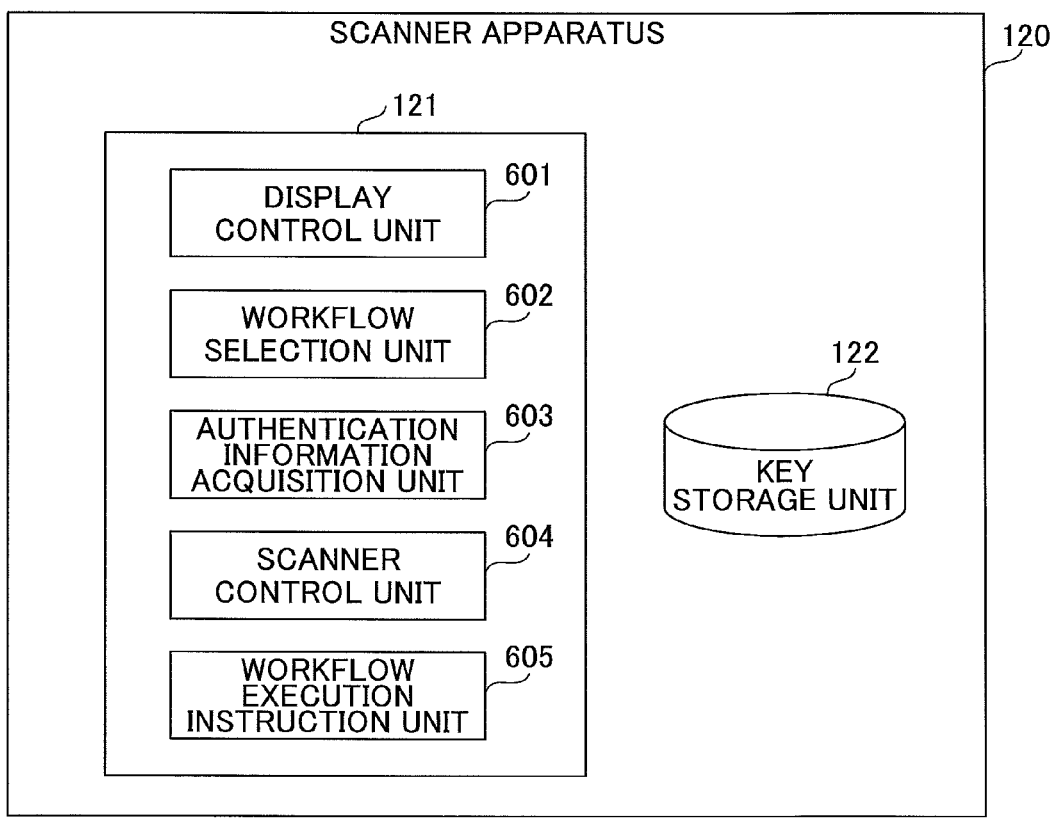
FIG. 5 illustrates an exemplary configuration of key information stored in a key storage unit.
FIG. 6 illustrates an exemplary functional configuration of the scanner apparatus.

In the following, information stored in the scanner apparatus 120 is described in greater detail. FIG. 5 illustrates an exemplary configuration of key information 500 stored in the key storage unit 122 included in the scanner apparatus 120. In FIG. 5, the key information 500 includes the information items "key identifier" and "description".

The "key identifier" stores an identifier for acquiring authentication information from the mobile terminal 160 by establishing near field communication with the mobile terminal 160.

The "description" stores information describing the request corresponding to the identifier stored in the "key identifier". In the example of FIG. 5, the "description" for "key identifier"="1" stores information indicating that the corresponding request is an "acquisition request for acquiring authentication information for using cloud service A". The "description" for "key identifier"="2" stores information indicating that the corresponding request is an "acquisition request for acquiring authentication information for using cloud service B". Further, the "description" for "key identifier"="3" stores information indicating that the corresponding request is an "acquisition request for acquiring authentication information for using cloud service C".

That is, while near field communication is established with the mobile terminal 160, the scanner apparatus 120 may successively transmit the key identifiers to the mobile terminal 160, and as responses, the scanner apparatus 120 may acquire the corresponding authentication information for using the cloud services A-C (delivery destinations of the plug-ins 410-430) if they are available.

<Functional Configuration of Scanner Apparatus>

In the following, functions implemented by the scanner apparatus 120 upon executing the workflow execution instruction program 121 are described. FIG. 6 illustrates an exemplary functional configuration of the scanner apparatus 120.

In FIG. 6, the scanner apparatus 120 includes a display control unit 601, a workflow selection unit 602, an authentication information acquisition unit 603, a scanner control unit 604, and a workflow execution instruction unit 605.

The display control unit 601 controls display of a display screen by the display unit of the scanner apparatus 120.

The workflow selection unit 602 acquires a list of workflow files stored at the delivery server 110 and instructs the display control unit 601 to display the acquired list on the display unit. Also, the workflow selection unit 602 notifies the workflow execution instruction unit 605 of a workflow ID of a workflow file selected by the user from the displayed list of workflow files.

The authentication information acquisition unit 603 determines the validity of login information used upon logging into the scanner apparatus 120. Also, the authentication information acquisition unit determines whether a plug-in for calling a plug-in that executes a delivery process to a cloud service is included in the workflow file selected by the workflow file selection unit 602. Further, if such as plug-in is included in the selected workflow file, the authentication information acquisition unit 603 acquires authentication information from the mobile terminal. More specifically, the authentication information acquisition unit 603 directs the display control unit 601 to display a display screen instructing the user to hold the mobile terminal 160 close to the scanner apparatus 120 such that near field communication may be established between the mobile terminal 160 and the scanner apparatus 120. When the user holds the mobile terminal 160 close to the scanner apparatus 120, near field communication may be established with the mobile terminal 160 via the NFC unit 308 and the authentication information acquisition unit 603 may thus acquire the authentication information from the mobile terminal 160. Further, the authentication information acquisition unit 603 directs the display control unit 601 to display information indicating the cloud services for which authentication information has been acquired.

Also, the authentication information acquisition unit 603 conveys to the workflow execution instruction unit 605 information indicating the cloud service selected by the user from the cloud services for which authentication information has been acquired and corresponding authentication information for using the selected cloud service.

By configuring the scanner apparatus 120 to acquire authentication information from the mobile terminal 160 of the user, cloud services that are regularly used by the user via the mobile terminal 160 may be used as delivery destinations upon performing a delivery process at the delivery server 110.

The scanner control unit 604 controls the scanner 310 to scan a document when a user presses a start button and acquires the scanned image generated by the scanner 310. Also, the scanner control unit 604 outputs the acquired scanned image to the workflow execution instruction unit 605.

The workflow execution instruction unit 605 transmits a workflow execution instruction to the delivery server 110. The workflow execution instruction may include at least one of the following:
Workflow ID of workflow file selected by the workflow selection unit;
   Authentication information that is acquired by the authentication information acquisition unit and selected by the user, and information indicating the cloud service that may be used based on this authentication information; and
   Scanned image acquired by the scanner control unit.

<Delivery Process of Delivery System>

Figure 7:
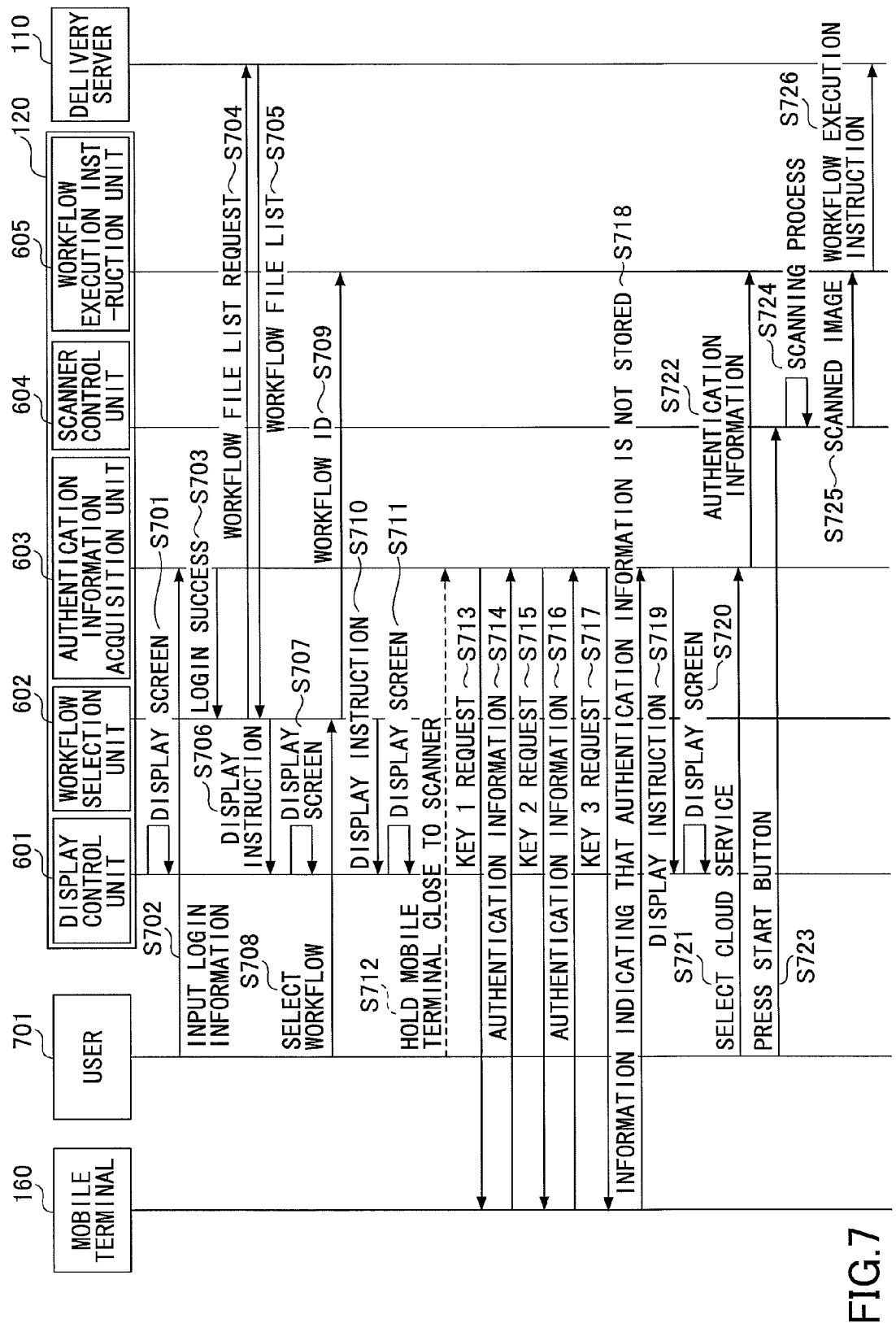
FIG. 7 is a sequence chart illustrating an exemplary process flow of a delivery process implemented in the delivery system according to the first embodiment.

In the following, a delivery process implemented by the delivery system 100 is described with reference to FIGS. 7-10. FIG. 7 is a sequence chart illustrating an exemplary flow of the delivery process implemented by the delivery system 100. FIGS. 8A-10 illustrate exemplary display screens that may be displayed by the display unit of the scanner apparatus 120.

Figure 8A:
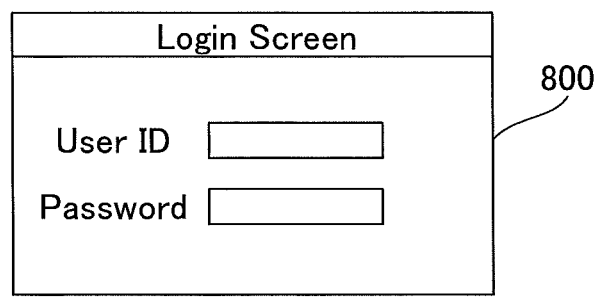
FIGS. 8A and 8B illustrate exemplary display screens that may be displayed at the scanner apparatus.

Referring to FIG. 7, when the workflow execution instruction program 121 is started, in step S701, the display control unit 601 displays a login screen. FIG. 8A is a diagram illustrating an example of a login screen 800. As illustrated in FIG. 8A, a user ID and a password are input as login information to the login screen 800.

Referring back to FIG. 7, in step S702, when a user 701 inputs a user ID and a password as login information, in step S703, the authentication information acquisition unit 603 determines the accuracy of the input login information. Also, if the accuracy of the input login information is confirmed, the authentication information acquisition unit 603 notifies the workflow selection unit 602 that, the user has successfully logged in.

In step S704, the workflow selection unit 602 sends a request to the delivery server 110 for a list of workflow files stored at the delivery server 110.

In step S705, in response to the request from the workflow selection unit 602, the delivery server 110 transmits a list of workflow files that are stored in the workflow storage unit 112 to the scanner apparatus 120.

In step S706, the workflow selection unit 602 outputs a display instruction to the display control unit 601 to have a workflow selection screen for displaying the received list of workflow files displayed.

Figure 8B:
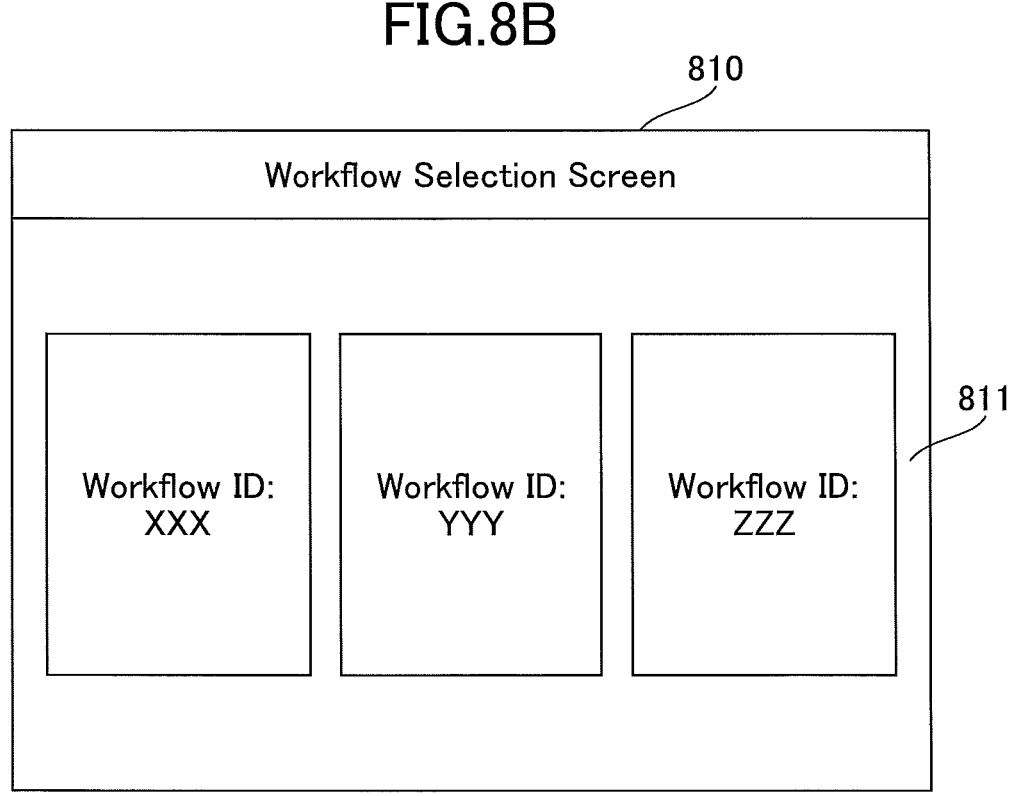

In step S707, the display control unit 601 displays the workflow selection screen on the display unit of the scanner apparatus 120. FIG. 8B is a diagram illustrating an example of a workflow selection screen 810. As illustrated in FIG. 8B, the workflow selection screen 810 includes a display area 811 displaying the list of the workflow files stored at the delivery server 110, and a selection field for selecting one of workflow files included in the list.

In step S708, the user 701 selects a desired workflow file (by checking the selection field of the desired workflow file and pressing a select button 812), and in turn, the process proceeds to step S709.

In step S709, the workflow selection unit 602 notifies the workflow execution instruction unit 605 of the workflow ID of the workflow file selected in step S708. Note that in a case where a cancel button 813 of the workflow selection screen 810 is pressed by the user 701, the process returns to step S704.

In step S710, the workflow selection unit 602 determines whether a group of plug-ins included in the selected workflow file contains a plug-in for calling a plug-in configured to execute a delivery process to a cloud service. If a plug-in for calling a plug-in configured to execute a delivery process to a cloud service is included in the group of plug-ins, the workflow selection unit 602 outputs a display instruction to the display control unit 601 to have an authentication information acquisition screen for prompting acquisition of authentication information displayed.

Figure 9:
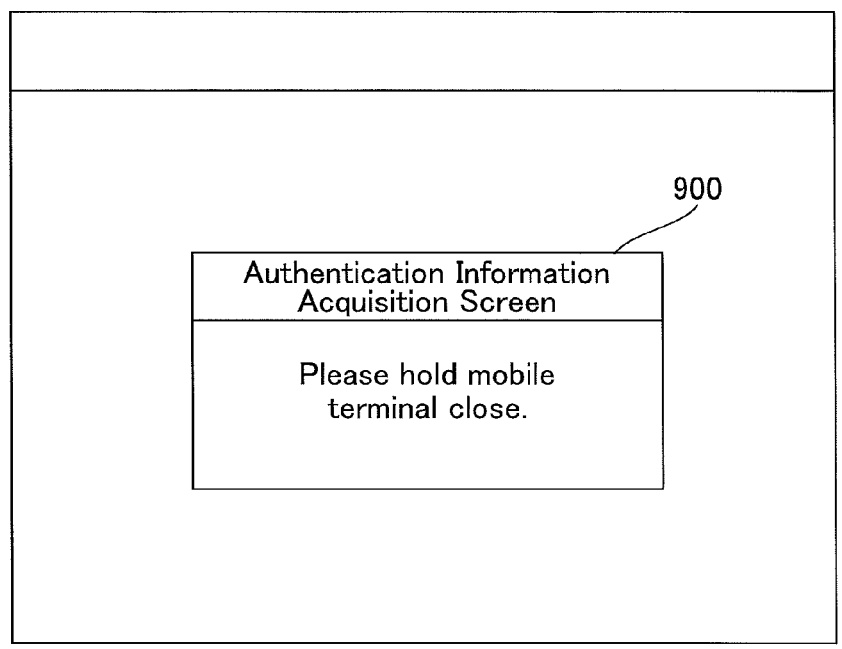
FIG. 9 illustrates another exemplary display screen that may be displayed at the scanner apparatus.

In step S711, the display control unit 601 displays the authentication information acquisition screen on the display unit of the scanner apparatus 120. FIG. 9 is a diagram illustrating an exemplary authentication information acquisition screen 900.

As illustrated in FIG. 9, the authentication information acquisition screen 900 includes a message prompting the user to establish near field communication between the scanner apparatus 120 and the mobile terminal 160.

In response to the authentication information acquisition screen 900 displayed on the display unit, the user 701 holds the mobile terminal 160 close to the scanner apparatus 120 (step S712).

When the user 701 holds the mobile terminal 160 close to the scanner apparatus 120, the authentication information acquisition unit 603 may establish near field communication with the portable terminal 160 via the NFC unit 308.

Specifically, in step S713, the authentication information acquisition unit 603 sends a request to the mobile terminal 160 for authentication information corresponding to "key identifier"="1". In step S714, the mobile terminal 160 determines whether it has the authentication information corresponding to "key ID"="1" stored therein. If the authentication information is stored therein, the mobile terminal 160 transmits the authentication information to the authentication information acquisition unit 603.

Then, in step S715, the authentication information acquisition unit 603 sends a request to the mobile terminal 160 for authentication information corresponding to "key identifier"="2". In step S716, the mobile terminal 160 determines whether the authentication information corresponding to "key identifier"="2" is stored therein. If the authentication information is stored therein, the mobile terminal 160 sends the authentication information to the authentication information acquisition unit 603.

Then, in step S717, the authentication information acquisition unit 603 sends a request to the mobile terminal 160 for authentication information corresponding to "key identifier"="3". In step S718, the mobile terminal 160 determines whether it has the authentication information corresponding to "key identifier"="3" stored therein. If the mobile terminal 160 does not have the authentication information stored therein, the mobile terminal 160 transmits to the authentication information acquisition unit 603 information indicating that it does not have the authentication information corresponding to "key identifier"="3".

In step S719, the authentication information acquisition unit 603 identifies the cloud services for which it was able to acquire authentication information. Further, the authentication information acquisition unit 603 outputs to the display control unit 601 a display instruction to display a cloud service selection screen for prompting the user to select a cloud service that is to become a delivery destination from the identified cloud services.

Figure 10:
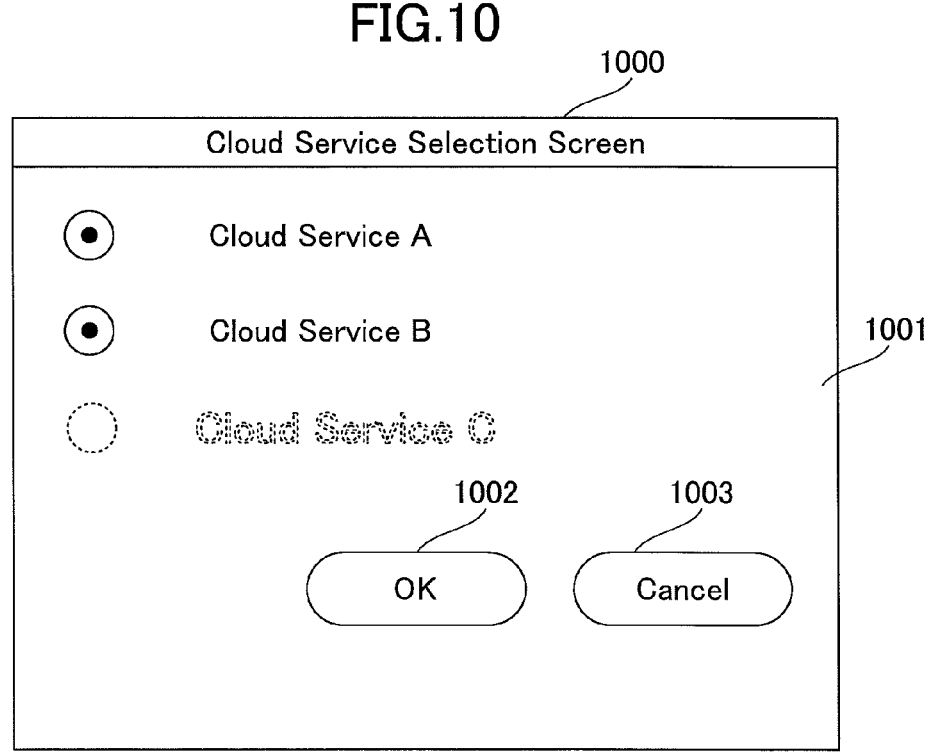
FIG. 10 illustrates another exemplary display screen that may be displayed at the scanner apparatus.

In step S720, the display control unit 601 displays the cloud service selection screen on the display unit. FIG. 10 is a diagram illustrating an example of a cloud service selection screen 1000. As illustrated in FIG. 10, the cloud service selection screen 1000 displays information indicating all the cloud services for which authentication information acquisition requests were issued in steps S713, S715, and S717 in a display area 1001.

Note, however, that in the display area 1001, the information indicating the cloud services for which authentication information acquisition requests have been issued are displayed in different display modes depending on whether the authentication information for the cloud service has been acquired.

In steps S714 and S716, the authentication information for using the cloud service A and the authentication information for using the cloud service B have been acquired. Accordingly, the cloud service selection screen 1000 displays the information indicating the cloud services A and B in a selectable display mode such that the cloud services A and B may be selected as a delivery destination. On the other hand, in step S718, the authentication information for using the cloud service C has not been acquired. Accordingly, the cloud service selection screen 1000 displays the information indicating the cloud service C in a non-selectable display mode so that the cloud service C cannot be selected as a delivery destination.

In step S721, the user 701 selects one or more cloud services (by checking the corresponding selection field of the desired cloud services, and pressing an OK button 1002), and in turn, the process proceeds to step S722.

In step S722, the authentication information acquisition unit 603 conveys to the workflow execution instruction unit 605 the information indicating the one or more cloud services selected in step S721. Further, the authentication information acquisition unit 603 conveys to the workflow execution instruction unit 605 the authentication information for using the selected cloud services (i.e. authentication information acquired in steps S714 and S716). Note that in a case where a cancel button 1003 in the cloud service selection screen 1000 is pressed by the user 701, the process returns to step S711.

In step S723, the user 701 presses the start button to issue an instruction to execute the workflow file, and in turn, in step S724, the scanner control unit 604 controls the scanner 310 to acquire a scanned image.

In step S725, the scanner control unit 604 outputs the acquired scanned image to the workflow execution instruction unit 605.

In step S726, the workflow execution instruction unit 605 transmits a workflow execution instruction to the delivery server 110. The workflow execution instruction transmitted to the delivery server 110 may include the following:

Workflow ID conveyed in step S709;

Information indicating the selected cloud services and the authentication information for using the selected cloud services conveyed in step S722; and Scanned image output in step S725.

In turn, the delivery server 110 executes the workflow file according to the workflow execution instruction from the scanner apparatus 120.

<Summary>

As can be appreciated from the above descriptions, the scanner apparatus according to the present embodiment implements the following features:

When a workflow file selected by a user includes a delivery process to a cloud service, the scanner apparatus is configured to acquire authentication information for using the cloud service from a mobile terminal of the user.

The scanner apparatus is configured to acquire the authentication information from the mobile terminal of the user by establishing near field communication with the mobile terminal.

According to an aspect of the present embodiment, even when executing a workflow file that includes a delivery process to a cloud service, the user may set up the required authentication information by simply holding the mobile terminal close to the scanner apparatus.

By utilizing the authentication information for using a cloud service that is stored in the mobile terminal 160 to execute a delivery process at the delivery server 110 as described above, the user may be relieved of the burden of having to manually input the authentication information at the scanner apparatus 120. As a result, user convenience may be improved in the delivery system in a case where a cloud service is selected as a delivery destination.

[Second Embodiment]

In the first embodiment, all the authentication information for using a cloud service is acquired from the mobile terminal 160. However, the present invention is not limited to such an embodiment. For example, in a second embodiment of the present invention, an authentication server may be separately provided, and a part of the authentication information may be acquired from a registered authentication information storage unit within the authentication server. In this case, cloud services that may be selected as a delivery destination may include both cloud services for which authentication information has been acquired from the mobile terminal 160 and cloud services for which authentication information has been acquired from the authentication server. Also, in a case where a cloud service for which authentication information has been acquired from the mobile terminal 160 overlaps with a cloud service for which authentication information has been acquired from the authentication server, the authentication information for using the cloud service acquired from the mobile terminal 160 may be used upon accessing and using the corresponding cloud service. In the following, the present invention is described in greater detail.

<Overall Configuration of Delivery System>

Figure 11:
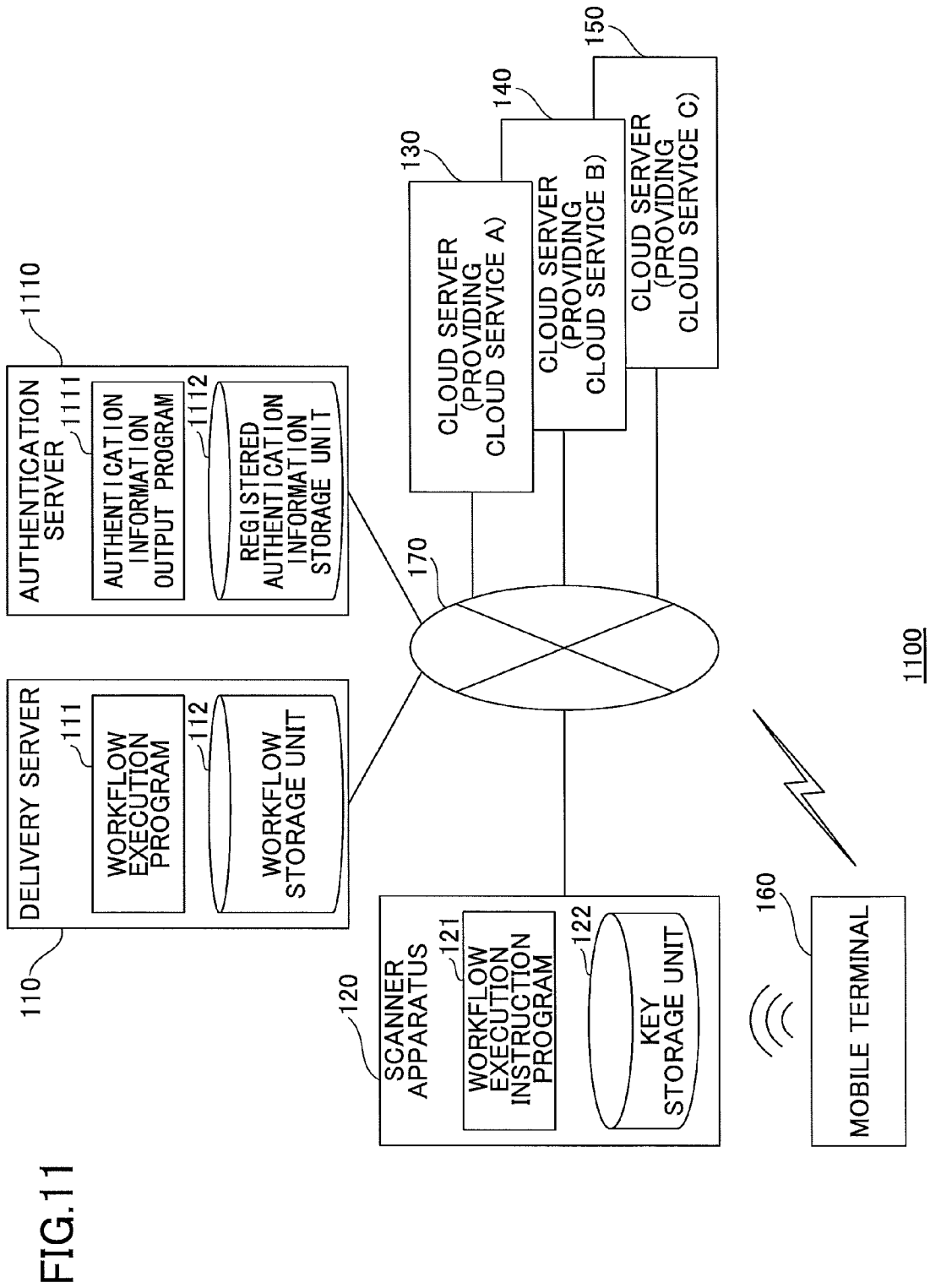
FIG. 11 illustrates an exemplary overall configuration of a delivery system according to a second embodiment of the present invention.

FIG. 11 illustrates an overall configuration of a delivery system 1100 according to the present embodiment. Note that in FIG. 11, elements of the delivery system 1100 that are substantially identical to the elements of the delivery system 100 illustrated in FIG. 1 are given the same reference numbers and their descriptions are omitted.

The delivery system 1100 of the present embodiment differs from the delivery system 100 of the first embodiment in that it includes an authentication server 1110 that is connected to the network 170. The authentication server 1110 includes an authentication information output program 1111 and a registered authentication information storage unit 1112.

The authentication information output program 1111 extracts authentication information corresponding to the login information of the user that has started the workflow execution instruction program 121 at the scanner apparatus 120 from the registered authentication information storage unit 1112 and sends the extracted authentication information to the scanner apparatus 120.

The registered authentication information storage unit 1112 stores corresponding authentication information for using each of the cloud services A-C for each user (user login information).

<Information Stored in Authentication Server>

In the following, information stored in the authentication server 1110 is described. FIG. 12 is a diagram illustrating an example of registered authentication information 1200 stored in the registration authentication information storage unit 1112 of the authentication server 1110.

As illustrated in FIG. 12, the registered authentication information 1200 includes information items such as "user name", "login information for workflow execution instruction program", "authentication information for cloud service A", "authentication information for cloud service B", and "authentication information for cloud service C".

The "user name" stores the user name of the user using the workflow execution instruction program 121.

The "login information for workflow execution instruction program" stores login information to be input by each user upon starting the workflow execution instruction program 121. Note that the information items "ID" and "password" are separately stored as the login information for the workflow execution instruction program.

The "authentication information for cloud service A" corresponds to authentication information to be used by each user upon using the cloud service A. Note that the information items "ID" and "password" are separately stored as the authentication information for the cloud service A.

Similarly, the "authentication information for cloud service B" corresponds to authentication information to be used by each user upon using the cloud service B. Note that the information items "ID" and "password" are separately stored as the authentication information for the cloud service B.

Similarly, the "authentication information for cloud service C" corresponds to authentication information to be used by each user upon using the cloud service C. Note that the information items "ID" and "password" are separately stored as the authentication information for the cloud service C.

The information stored for each of the information items included in the registered, authentication information 1200 may be stored in advance by an administrator that manages the delivery server 110, for example.

<Delivery Process of Delivery System>

Figure 13:
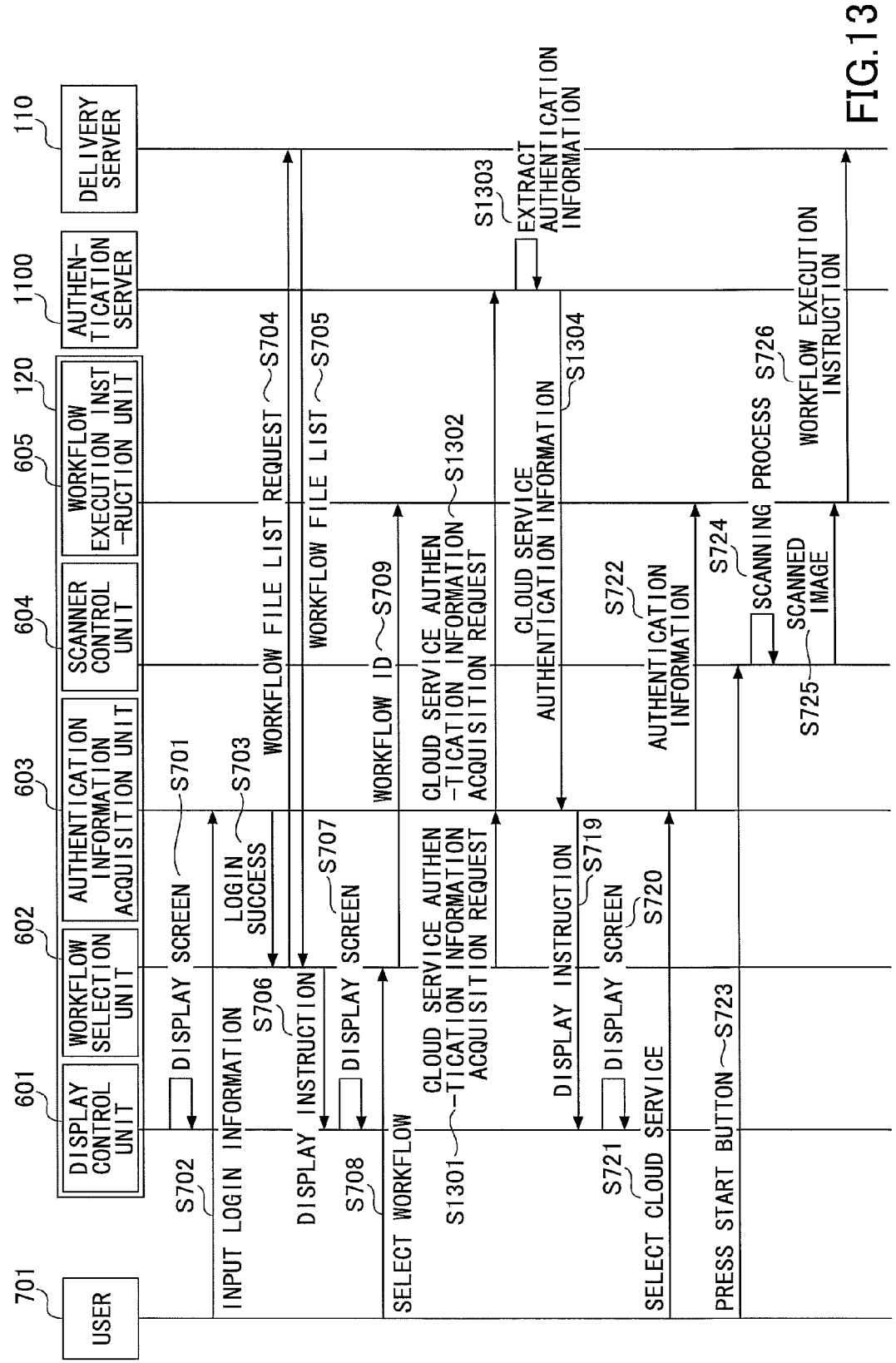
FIG. 13 is a sequence chart illustrating an exemplary process flow of a delivery process implemented in the delivery system according to the second embodiment.

In the following, a delivery process implemented by the delivery system 1100 is described with reference to FIG. 13. FIG. 13 is a sequence chart illustrating an exemplary flow of a delivery process implemented by the delivery system 1100. Note that process steps of the delivery process illustrated in FIG. 13 that are substantially identical to the process steps illustrated in FIG. 7 are given the same reference numbers and their descriptions are omitted. The delivery process of FIG. 13 differs from that illustrated in FIG. 7 in that it implements steps S1301-S1304.

In step S1301, the workflow selection unit 602 determines whether the group of plug-ins included in the workflow file selected in step S708 includes a plug-in for calling a plug-in configured to execute a delivery process to a cloud service. If a plug-in for calling a plug-in configured to execute a delivery process is included in the group of plug-ins, the workflow selection unit 602 outputs an authentication information acquisition request to the authentication information acquisition unit 603 for acquiring the authentication information corresponding to the login information input by the user 701 in step S702.

In step S1302, the authentication information acquisition unit 603 sends the authentication information acquisition request to the authentication server 1110.

In step S1303, the authentication server 1110 that has received the authentication information acquisition request extracts from the registered authentication information 1200 the authentication information corresponding to the login information input by the user 701.

In step S1304, the authentication server 1110 transmits to the authentication information acquisition unit 603 the authentication information extracted from the registered authentication information 1200 and information indicating the cloud services that may be used by the authentication information.

In turn, the authentication information acquisition unit 603 issues a display instruction to the display control unit 601 based on the received information indicating the accessible cloud services (step S719). Also, the authentication information acquisition unit 603 notifies the workflow execution instruction unit 605 of the authentication information for the cloud service selected by the user from the received authentication information (step S722).

Note that in FIG. 13, in view of space limitations, the processes of steps S1301-S1304 are illustrated in place of the processes of steps S707-S715 of FIG. 7. However, in some embodiments, the processes of steps S1301-S1304 may be executed after the processes up to step S715 of FIG. 7 have been executed such that authentication information that could not be acquired from the mobile terminal 160 may be acquired from the authentication server 1100, for example.

<Summary>

As can be appreciated from the above descriptions, the scanner apparatus according to the present embodiment is configured to acquire authentication information for using a cloud service from an authentication server in addition to acquiring such authentication information from a mobile terminal of a user.

In this way, the number cloud services selectable by the user may be increased and user convenience may be further improved.

[Third Embodiment]

In the second embodiment described above, the scanner apparatus 120 is configured to acquire authentication information for using a cloud service from a mobile terminal of a user and an authentication server. However, the present invention is not limited to such an embodiment. For example, in a third embodiment of the present invention, the scanner apparatus 120 may be configured to enable a user to manually input authentication information that is not stored in the registered authentication information 1200.

By having the user manually input authentication information for using a cloud service that could not be acquired from the mobile terminal 160 of the user nor the authentication server 1110, such a cloud service may also be selected as a delivery destination.

[Fourth Embodiment]

In the embodiments described above, a scanner apparatus is used as an example of an image processing apparatus. However, an image processing apparatus according to the present invention is not limited to a scanner apparatus. The image processing apparatus according to the present invention may include other types of apparatuses such as a copying machine and an MFP (multifunction peripheral).

Also, the scanner apparatus 120 described above is an example of an image processing apparatus configured to input data designated by a user and direct the execution of a delivery process for delivering the input data. However, the present invention is not limited to the above scanner apparatus 120 nor an apparatus dedicated to image processing. For example, a client terminal such as a PC or some other type of information processing apparatus may be used in the present invention. Accordingly, a data input method for inputting data to be processed is not limited to scanning a document with the scanner 310 as described above. For example, the data input method may involve designating data stored in an image processing apparatus or an information processing apparatus such as a client terminal.

Also, in the embodiments described above, a scanned image is subject to processing by a workflow file. However, an image subject to processing by a workflow file is not limited to a scanned image. That is, the scanned image described above is merely one example of data designated by a user that is subject to a delivery process. The data subject to the delivery process is not limited to a scanned image but may be other types of data including electronic data such as application data stored by the user in a client terminal. Also, in some embodiments a URL may be used to designate the storage location of the data subject to a delivery process, for example. That is, the delivery process may be implemented using information indicating the acquisition source of the data subject to the delivery process instead of using the data subject to the delivery process itself.

Also, in the embodiments described above, the login information is input to the scanner apparatus 120 and the authentication information is transmitted by the mobile terminal 160 at different timings. However, in other embodiments the login information input and the authentication information transmission may be performed at the same time. For example, by fixing a workflow file for delivering a scanned image, the login information input and the authentication information transmission may be performed at the same time by merely having the mobile terminal 160 establish near field communication once.

[Fifth Embodiment]

Figure 14:
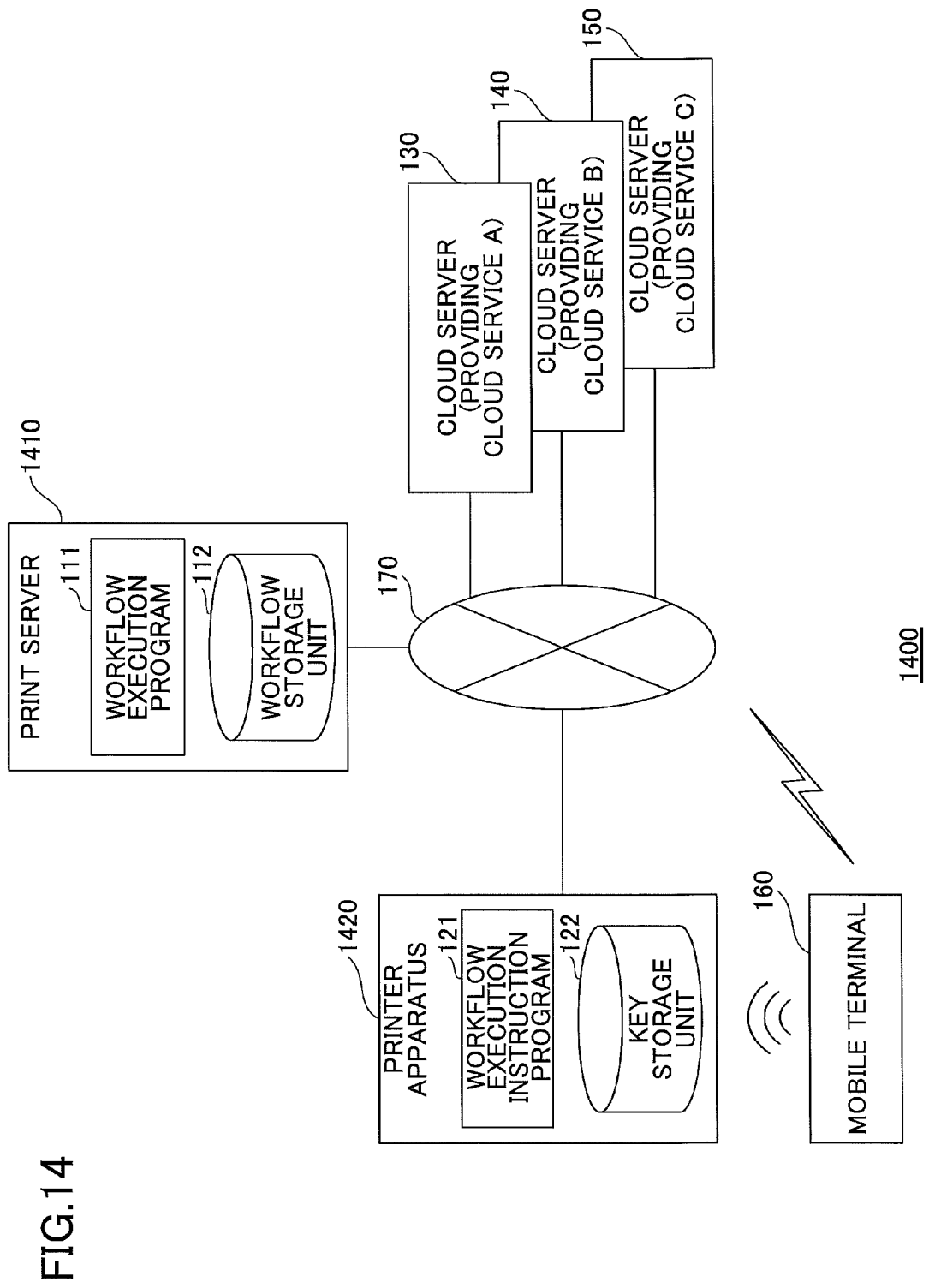
FIG. 14 illustrates an overall configuration of a print system according to a fifth embodiment of the present invention.

In the above embodiments, a delivery system is illustrated as an example of an information processing system of the present invention. However, the present invention is not limited to a delivery system. In the following, a print system is described as an information processing system according to another embodiment of the present invention. FIG. 14 illustrates an exemplary overall configuration of a print system 1400 according to a fifth embodiment of the present invention.

In FIG. 14, the print system 1400 includes a print server 1410, a printer apparatus 1420 as an example of an image processing apparatus according to the present embodiment, the cloud servers 130-150 as acquisition sources of print data, and the mobile terminal 160. The print server 1410, the printer apparatus 1420, the cloud servers 130-150, and the mobile terminal 160 are interconnected via a network 170. Note that although three cloud servers are connected to the network 170 in the example illustrated in FIG. 14, the number of cloud servers is not limited to three.

Also, in the present embodiment, it is assumed that the print system 1400 is configured to enable the printer apparatus 1420 and the mobile terminal 160 to exchange information through near field communication (NFC).

The print server 1410 includes a workflow execution program 111 and a workflow storage unit 112.

The workflow execution program 111 executes a workflow file stored in the workflow storage unit 112 that is selected by a user at the printer apparatus 1420.

By having the workflow execution program 111 execute a workflow file, print data stored in the print server 1410 or the cloud server 130 or 140 may be acquired and printed by the printer apparatus 1420, for example.

The printer apparatus 1420 is configured to print out print data. The printer apparatus 1420 includes a workflow execution instruction program 121 and a key storage unit 122.

The workflow execution instruction program 121 acquires print data, selects a workflow file to be used to instruct execution of a print process, and sets up information necessary for executing the selected workflow file. Also, the workflow execution instruction program 121 outputs to the print server 1410 an execution instruction to execute the selected workflow file based on the setup information.

The key storage unit 122 may be substantially identical to the key storage unit 122 described above in connection with the first embodiment, and accordingly, descriptions thereof are omitted. The cloud servers 130-150 may also be substantially identical to the cloud servers 130-150 described above in connection with the first embodiment, and accordingly, descriptions thereof are omitted.

Note that in order to access the cloud servers 130-150 to acquire print data or a print data list from the cloud servers 130-150, for example, predetermined authentication information has to be sent to the cloud servers 130-150. Thus, for example, when the print server 1410 is to acquire print data from one of the cloud servers 130-150 as an acquisition source, predetermined authentication information has to be sent to the cloud server corresponding to the acquisition source (acquisition target).

The mobile terminal 160 may be substantially identical to the mobile terminal 160 described above in connection with the first embodiment, and accordingly, descriptions thereof are omitted. Note that the mobile terminal 160 is configured to establish near field communication with the printer apparatus 1420 to transmit authentication information for using the cloud services A and B to the printer apparatus 1420. That is, according to the present embodiment, the user can simply hold the mobile terminal 160 close to the printer apparatus 1420 to notify the printer apparatus 1420 of the cloud services A and B that the mobile terminal 160 is able to use such that the cloud services A and B may be selected as an acquisition source (acquisition target) when the print server executes a print data acquisition process.

<Hardware Configuration of Print Server>

Figure 15:
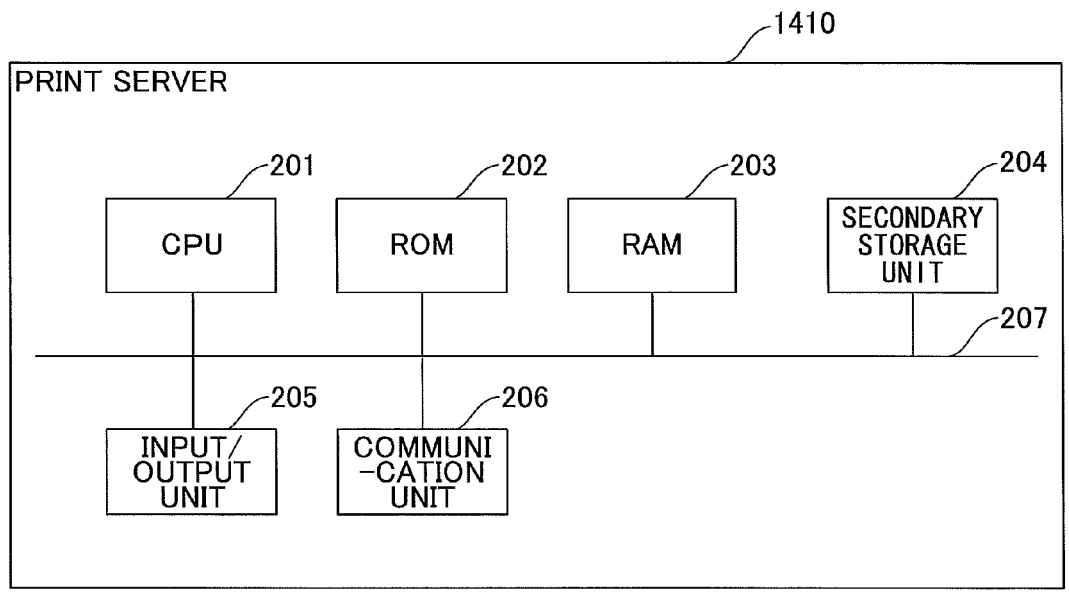
FIG. 15 illustrates an exemplary hardware configuration of a print server.

FIG. 15 illustrates an exemplary hardware configuration of the print server 1410. Note that the hardware configuration of the print server 1410 illustrated in FIG. 15 is substantially identical to the hardware configuration of the delivery server 110 as illustrated in FIG. 2. Accordingly, descriptions thereof are omitted.

<Hardware Configuration of Printer Apparatus>

Figure 16:
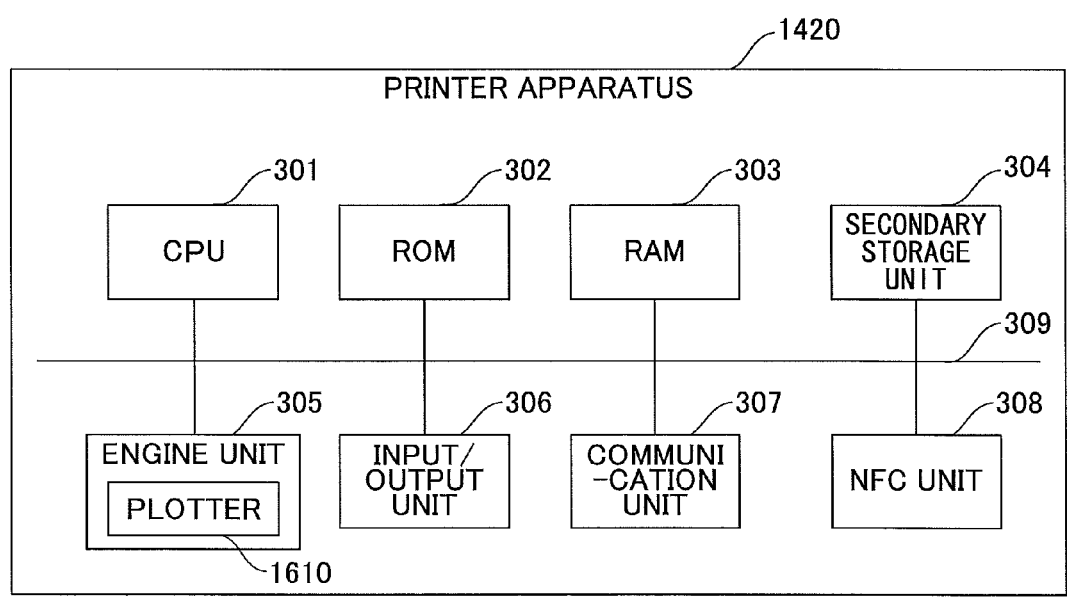
FIG. 16 illustrates an exemplary hardware configuration of a printer apparatus.

FIG. 16 illustrates an exemplary hardware configuration of the printer apparatus 1420. Note that the hardware configuration of the printer apparatus 1420 illustrated in FIG. 16 is, for the most part, identical to the hardware configuration of the scanner apparatus 120 as illustrated in FIG. 3. However, the engine unit 305 of the printer apparatus 1420 differs from the engine unit 305 of the scanner apparatus 120.

In the printer apparatus 1420, the engine unit 305 includes a plotter 1610. The engine unit 305 controls the plotter 1610 based on print data to print the print data.

<Information Stored in Print Server>

Figure 17:
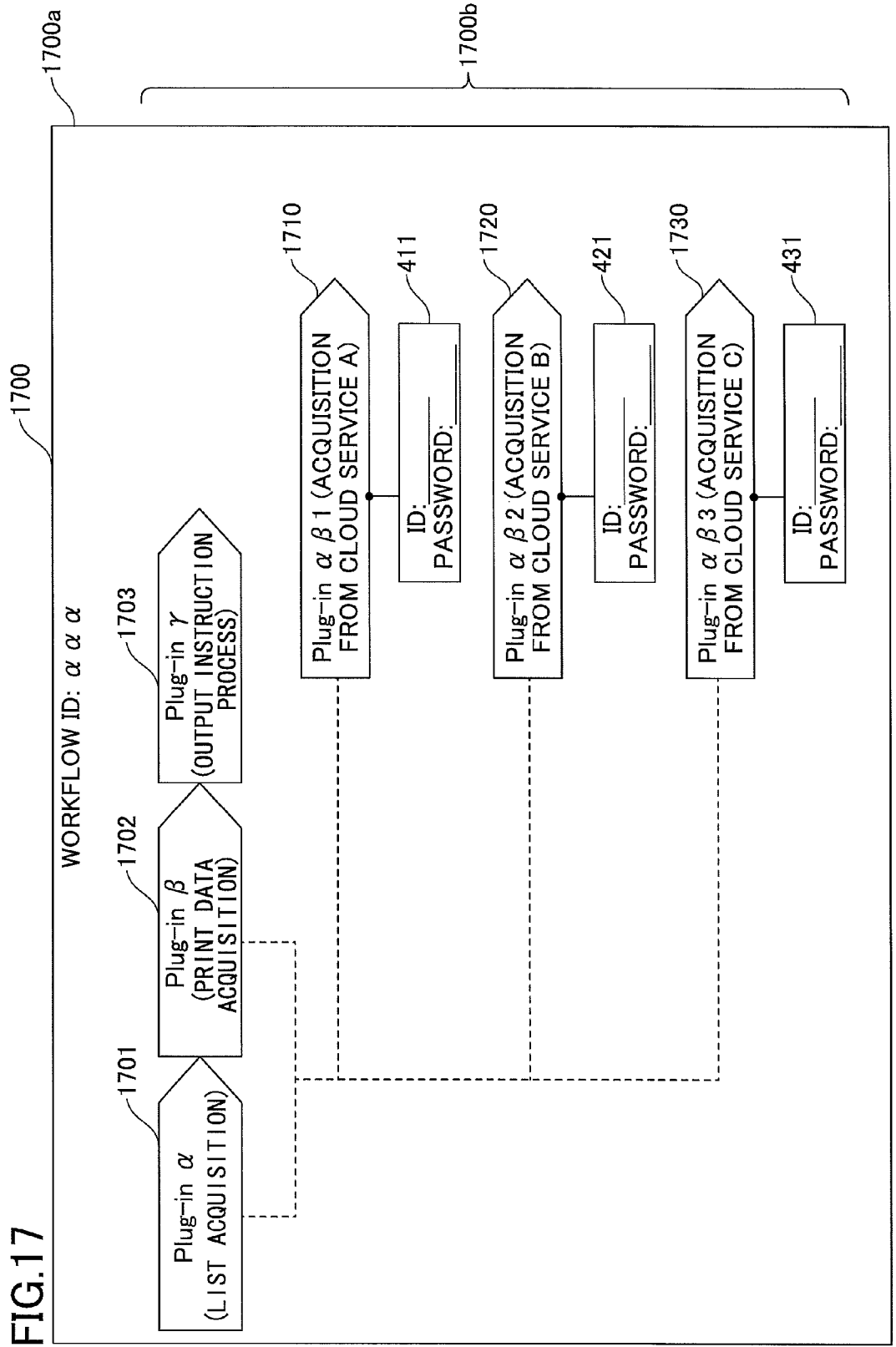
FIG. 17 illustrates an example of a workflow file according to the fifth embodiment.

In the following, information stored in the print server 1410 is described. FIG. 17 illustrates an example of a workflow file 1700 stored in the workflow storage unit 112 of the print server 1410.

As illustrated in FIG. 17, the workflow file 1700 includes a workflow ID 1700*a* identifying the workflow file 1700 and detailed information 1700*b* including setting information relating to the group of plug-ins making up the workflow of the workflow file and the individual plug-ins.

In the example of FIG. 17, the "workflow ID" of the workflow file 1700 is indicated as "ααα". The workflow to file 1700 includes a plug-in 1701 labeled "Plug-in α", a plug-in 1702 labeled "Plug-in β", and a plug-in 1703 labeled "Plug-in γ".

The plug-in 1701 labeled "Plug-in α" is configured to execute a "list acquisition process" that involves acquiring a list of print data to be printed at the printer apparatus 1420 and sending the list to the printer apparatus 1420.

The plug-in 1702 labeled "Plug-in β" is configured to execute a "print data acquisition process" that involves acquiring print data selected by a user based on the acquired list and sending the acquired print data to the printer apparatus 1420.

The plug-in 1703 labeled "Plug-in γ" is configured to execute an "output instruction process" that involves instructing the printing of the print data transmitted to the printer apparatus 1420.

In the present embodiment, plug-ins that can be called by the plug-in 1701 labeled "Plug-in α" and the plug-in 1702 labeled "Plug-in β" include a plug-in 1710 labeled "Plug-in αβ1", a plug-in 1720 labeled "Plug-in αβ2", and a plug-in 1730 labeled "Plug-in αβ3".

Note that the plug-in of the above plug-ins 1710-1730 that is to be called by the plug-in 1701 or the plug-in 1702 may be determined based on an execution instruction or an acquisition request from the printer apparatus 1420.

The plug-in 1710 labeled "Plug-in αβ" is configured to execute a process for acquiring a list of print data or print data provided by the cloud service A. Note that authentication information 411 that is used when the plug-in 1710 labeled "Plug-in αβ" acquires a list of print data or print data provided by the cloud service A is associated with the plug-in 1710 labeled "Plug-in αβ1".

Similarly, the plug-in 1720 labeled "Plug-in αβ2" is configured to execute a process for acquiring a list of print data or print data provided by the cloud service B. Note that authentication information 421 that is used when the plug-in 1720 labeled "Plug-in αβ2" acquires a list of print data or print data provided by the cloud service B is associated with the plug-in 1720 labeled "Plug-in αβ2".

Similarly, the plug-in 1730 labeled "Plug-in αβ3" is configured to execute a process for acquiring a list of print data or print data provided by the cloud service C. Note that authentication information 431 that is used when the plug-in 1730 labeled "Plug-in αβ3" acquires a list of print data or print data provided by the cloud service C is associated with the plug-in 1730 labeled "Plug-in αβ3".

<Processes Executed by the Plug-Ins>

In the following, processes executed by the plug-ins included in the workflow file 1700 are described in greater detail. Specifically, the list acquisition process executed by the plug-in 1701 labeled "Plug-in α", the print data acquisition process executed by the plug-in 1702 labeled "Plug-in β" are described below.

<List Acquisition Process>

Figure 18A:
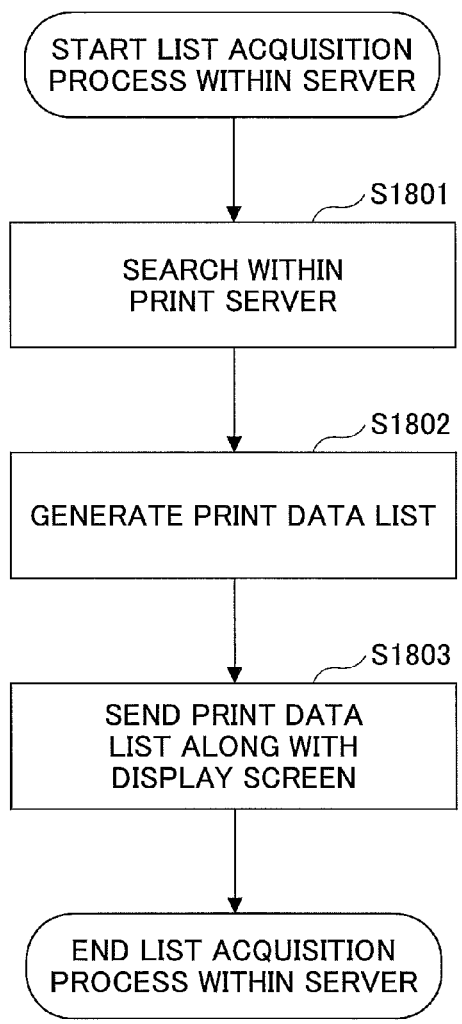
FIGS. 18A and 18B are flowcharts illustrating exemplary list acquisition processes.
Figure 18B:
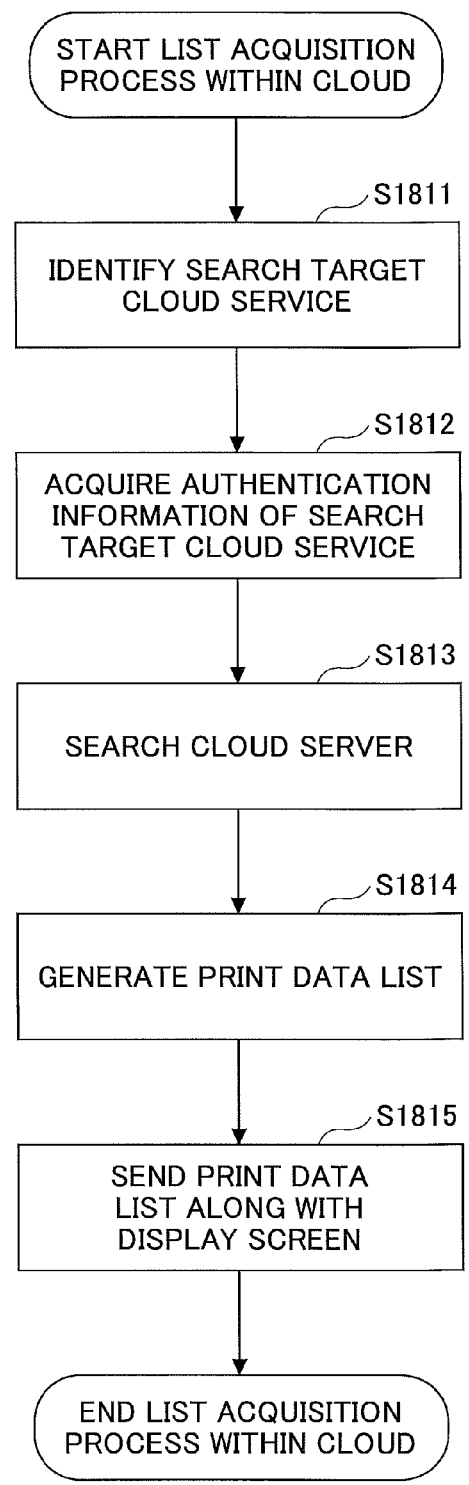

FIGS. 18A and 18B are flowcharts illustrating exemplary list acquisition processes. Specifically, FIG. 18A illustrates a list acquisition process that is executed by the plug-in 1701 labeled "Plug-in α" within the print server 1410.

The plug-in 1701 labeled "Plug-in α" may be executed upon receiving a workflow execution instruction with respect to the workflow file 1700 with the workflow ID "ααα". In this way, the list acquisition process within the print server 1410 may be started.

In step S1801, the plug-in 1701 conducts a search within the print server 1410. In step S1802, the plug-in 1701 generates a list of print data found by the search. In step S1803, the plug-in 1701 sends the generated print data list to the printer apparatus 1420. Also, the plug-in 1701 sends a display screen for displaying the print data list to the user and prompting the user to select print data from the print data list to the printer apparatus 1420.

FIG. 18B is a flowchart illustrating a list acquisition process that is executed by the plug-in 1701 labeled "Plug-in α" within a cloud while calling a relevant plug-in such as the plug-in 1710 labeled "Plug-in α1".

The plug-in 1710 labeled "Plug-in α1" may be called by the plug-in 1701 upon receiving a print data list acquisition request including authentication information for using a cloud service (cloud service A in the present example) from the printer apparatus 1420, for example. In this way, the plug-in 1710 may start the list acquisition process in the cloud. Note that in the present embodiment, the print data list acquisition request includes information indicating the cloud service corresponding to the search target that is to be searched (cloud service A) and authentication information for using the cloud service corresponding to the search target.

In step S1811, the plug-in 1710 identifies the cloud service A as the cloud service corresponding to the search target (search target cloud service) based on the print data list acquisition request. In step S1812, the plug-in 1710 acquires authentication information for using the cloud service A corresponding to the search target based on the print data list acquisition request.

In step S1813, the plug-in 1710 accesses the cloud server 130 using the acquired authentication information and searches the cloud server 130. In step S1814, the plug-in 1710 generates a list of print data found by the search.

In step S1815, the plug-in 1710 sends the generated print data list to the printer apparatus 1420. Also, the plug-in 1710 sends a display screen for displaying the print data list to the user and prompting the user to select print data from the list to the printer apparatus 1420.

<Print Data Acquisition Process>

In the following, the print data acquisition process is described. FIGS. 19A and 19B are flowcharts illustrating exemplary print data acquisition processes. Specifically, FIG. 19A illustrates an exemplary print data acquisition process to be executed by the plug-in 1702 labeled "Plug-in β" and the plug-in 1703 labeled "Plug-in γ" within the print server 1410.

The plug-in 1702 labeled "Plug-in β" and the plug-in 1703 labeled "Plug-in γ" may be executed upon receiving from the printer apparatus 1420 a print data acquisition request including information indicating print data stored within the print server 1410. In this way, the print data acquisition process within the print server 1410 may be started.

In step S1901, the plug-in 1702 conducts a search within the printer server 1410 based on the information indicating the print data included in the print data acquisition request. In step S1702, the plug-in 1702 acquires the print data found by the search. In step S1903, the plug-in 1703 sends the acquired print data to the printer apparatus 1420 and issues an instruction to print out the print data.

FIG. 19B is a flowchart illustrating an exemplary print data acquisition process to be executed by the plug-in 1702 labeled "Plug-in β" and the plug-in 1703 labeled "Plug-in γ" in a cloud. Note that the print data acquisition process in the cloud is executed by having the plug-in 1702 labeled "Plug-in β" call a relevant plug-in such as the plug-in 1710 labeled "Plug-in αβ1".

The plug-in 1710 labeled "Plug-in αβ1" may be called upon receiving from the printer apparatus 1420 the print data acquisition request including information indicating a cloud service (cloud service A in the present example) and authentication information for using the cloud service. In this way, the plug-in 1710 may start the print data acquisition processing in the cloud.

In step S1911, the plug-in 1710 identifies the cloud service A as an acquisition source (acquisition target cloud service) based on the print data acquisition request. In step S1912, the plug-in 1710 acquires authentication information for using the cloud service A corresponding the acquisition target based on the print data acquisition request.

In step S1913, the plug-in 1710 accesses the cloud server 130 using the acquired authentication information and searches the cloud server 130. In step S1914, the plug-in 1710 acquires print data found by the search.

In step S1915, the plug-in 1702 determines whether the acquired print data is in a data format printable by the printer apparatus 1420. If it is determined that the print data is in a printable data format, the process proceeds to step S1917.

On the other hand, if it is determined that the print data is not in a printable data format, the process proceeds to step S1916. In step S1916, the plug-in 1702 converts the acquired print data into a data format printable by the printer apparatus 1420.

In step S1917, the plug-in 1703 transmits the print data to the printer apparatus 1420 and issues an instruction to print out the print data.

<Information Stored in Printer Apparatus>

Key information stored in the key storage unit 122 of the printer apparatus 1420 may be substantially identical to the key information 500 of the first embodiment described above with reference to FIG. 5. Accordingly, descriptions thereof are omitted.

<Functional Configuration of Printer Apparatus>

Figure 20:
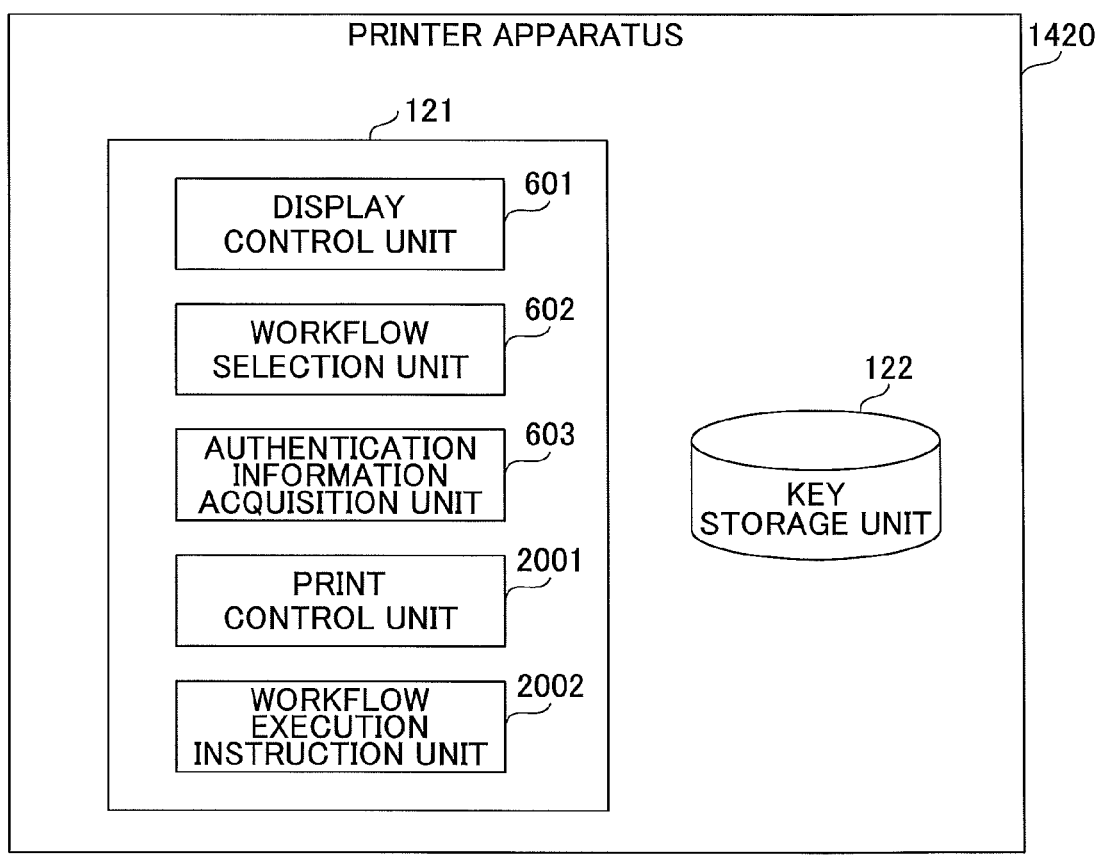
FIG. 20 illustrates an exemplary functional configuration of the printer apparatus.

In the following, functions that may be implemented by the printer apparatus 1420 executing the workflow execution instruction program 121 are described. FIG. 20 illustrates an exemplary functional configuration of the printer apparatus 1420. The functional configuration of the printer apparatus 1420 as illustrated in FIG. 20 is, for the most part, identical to the functional configuration of the scanner unit 120 as illustrated in FIG. 6. However, the printer apparatus 1420 illustrated in FIG. 20 includes a print control unit 2001 in place of the scanner control unit 604 of the scanner apparatus 120 illustrated in FIG. 6, and a workflow execution instruction unit 2002.

The print control unit 2001 controls the plotter 1610 to print out print data based on print data when a user presses a start button.

The workflow execution instruction unit 2002 sends a workflow execution instruction to the print server 1410. The workflow execution instruction includes the workflow ID of the workflow file selected by the workflow selection unit 602. Also, the workflow execution instruction unit 2002 may transmit to the print server 1410 an instruction input by the user 701 upon processing a plug-in included in a workflow file, and receive data transmitted from the print server 1410 in response to such a transmission, for example.

<Print Process of Print System>

Figure 21:
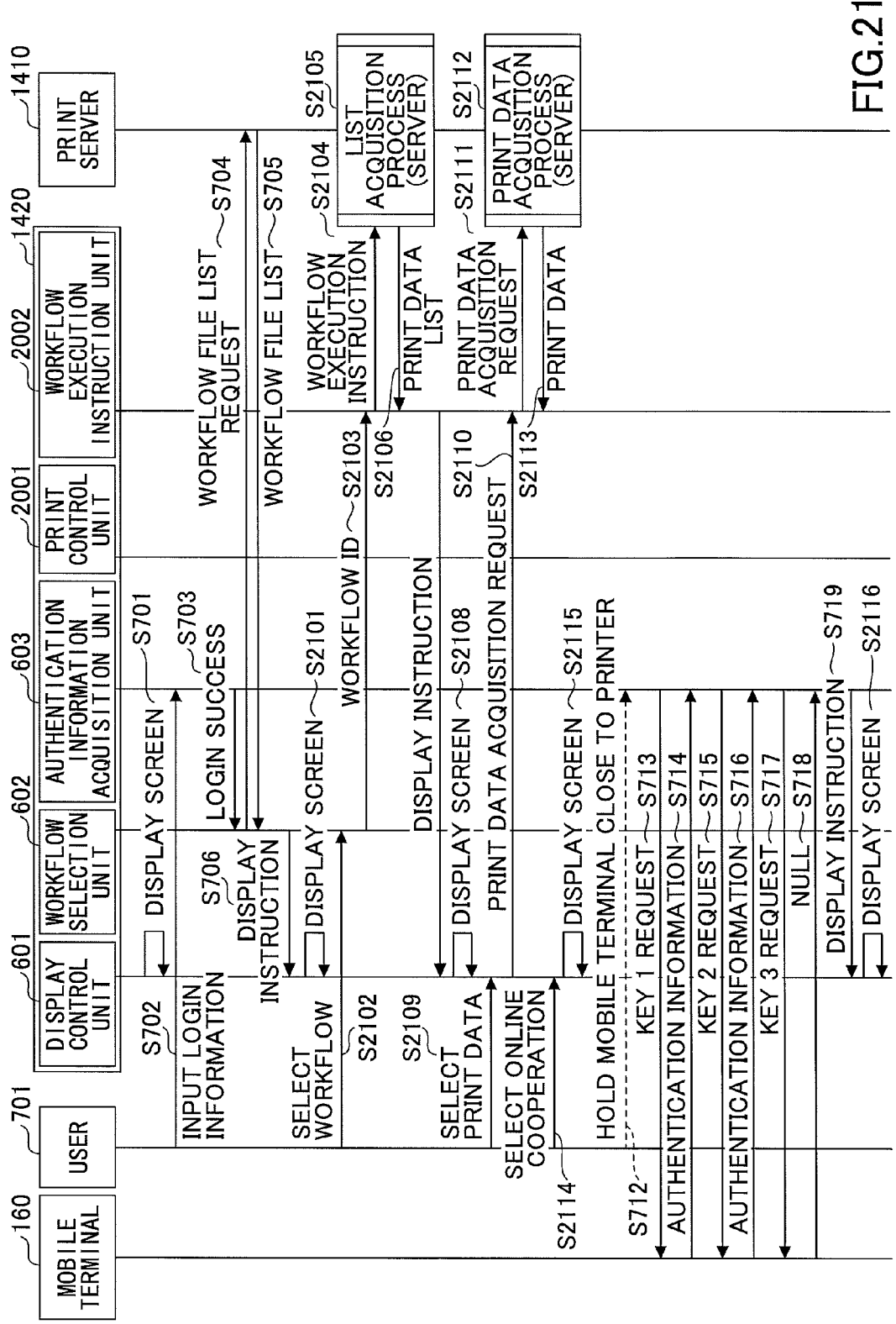
FIG. 21 is a sequence chart illustrating exemplary process steps of a print process implemented by the print system.
Figure 22:
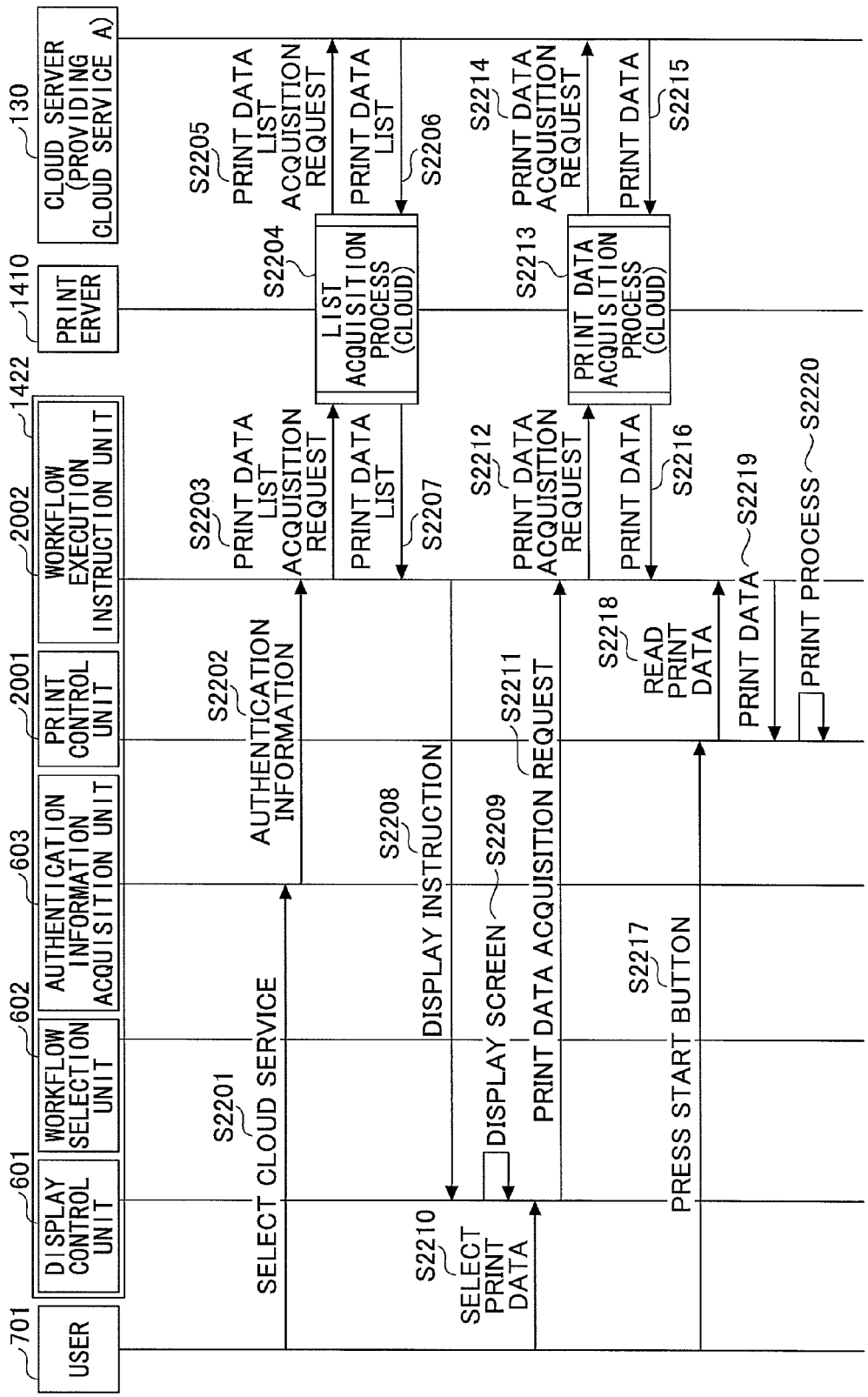
FIG. 22 is a sequence chart illustrating exemplary process steps of the print process implemented by the print system.

In the following, a print process of the print system 1400 is described with reference to FIGS. 21-26. FIGS. 21 and 22 are sequence charts illustrating exemplary process steps of a print process that may be implemented by the print system 1400. FIGS. 23-26 illustrate exemplary display screens that may be displayed on the display unit of the printer apparatus 1420.

The processes from step S701 of FIG. 21 and onward may be started by activating the workflow execution instruction program 121. Note that the processes of steps S701-S706 of FIG. 21 may be substantially identical to the processes of steps S701-S706 of FIG. 7, and as such, descriptions thereof are omitted.

Figure 23:
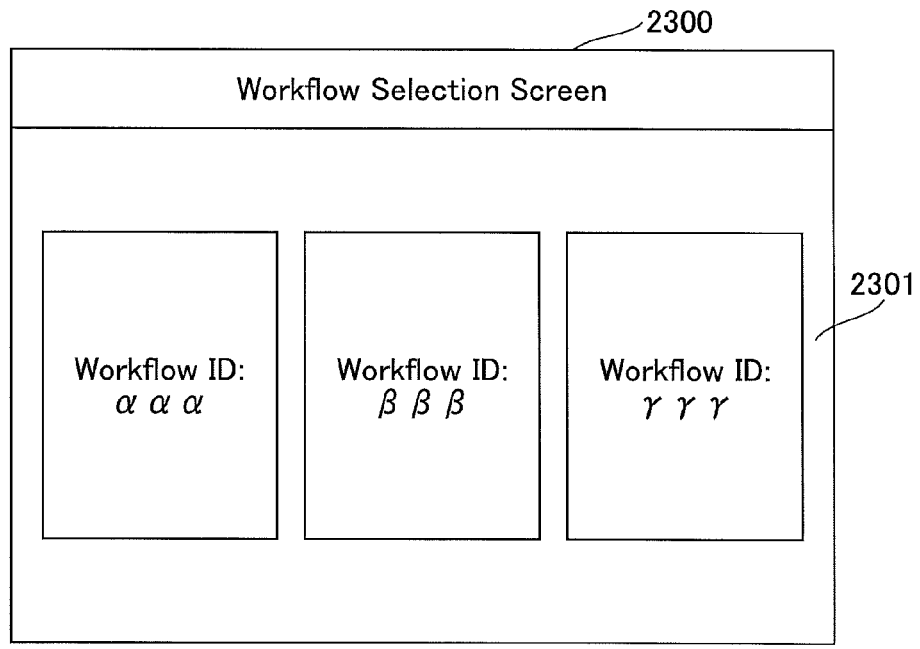
FIG. 23 illustrates an example of a display screen that may be displayed at the printer apparatus.

In step S2101, the display control unit 601 displays a workflow selection screen on the display unit. FIG. 23 illustrates an exemplary workflow selection screen 2300. As illustrated in FIG. 23, the workflow selection screen 2300 includes a display area 2301 displaying a list of workflow files stored in the print server 1410 and a selection field for selecting one of the workflow files being listed.

In step S2102, the user 701 selects a desired workflow file (by checking the selection field associated with the workflow file and pressing a select button 2302), and the process proceeds to step S2103.

In step S2103, the workflow selection unit 602 conveys the workflow ID of the workflow file selected in step S2102 to the workflow execution instruction unit 2002. Note that if a cancel button 2303 is pressed in the workflow selection screen 2300, the process returns to step S704.

In step S2104, the workflow execution instruction unit 2002 transmits a workflow execution instruction including the workflow ID of the selected workflow file to the print server 1410. In step S2105, the print server 1410 performs a list acquisition process within the server. Note that the list acquisition process within the server (step S2105) is described in detail above with reference to FIG. 18A.

In step S2106, the print server 1410 sends the print data list together with a corresponding display screen to the workflow execution instruction unit 2002. In step S2107, the workflow execution instruction unit 2002 instructs the display control unit 601 to display the print data list by conveying the print data list together with the display screen to the display control unit 601.

Figure 24:
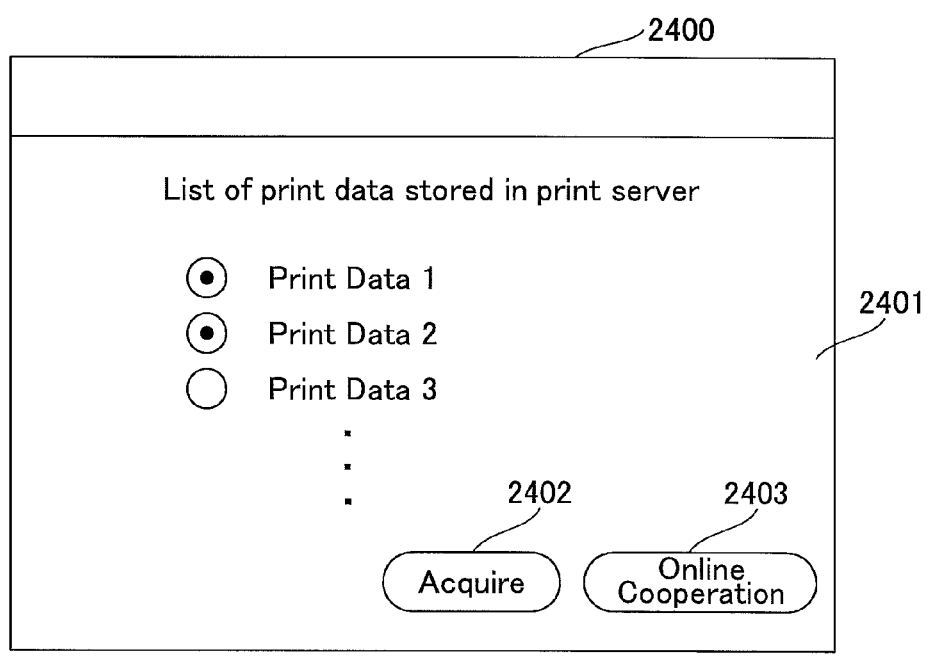
FIG. 24 illustrates another example of a display screen that may be displayed at the printer apparatus.

In step S2108, the display control unit 601 displays a print data list screen on the display unit. FIG. 24 illustrates an exemplary print data list screen 2400.

As illustrated in FIG. 24, the print data list screen 2400 includes a display area 2401 displaying a list of print data stored in the print server 1410 and a selection field for selecting the print data being listed.

In step S2109, the user 701 selects a desired print data (by checking the selection field associated with the print data and pressing an acquire button 2402), and the process proceeds to step S2110.

In step S2110, the display control unit 601 conveys the print data acquisition request including the information indicating the print data selected in step S2109 to the workflow execution instruction unit 2002. In step S2111, the workflow execution instruction unit 2002 sends the print data acquisition request to the print server 1410.

In step 2112, the print server 1410 that receives the print data acquisition request executes a print data acquisition process within the server. Note that the print data acquisition process executed within the server (step S2112) is described in detail above with reference to FIG. 19A.

After executing the print data acquisition process within the server, in step S2113, the print server 1410 sends the acquired print data to the workflow execution instruction unit 2002.

On the other hand, in step S2114, when the user 701 presses an online cooperation button 2403 of the print data list screen 2400 to select online cooperation, the display control unit 601 accepts the selection.

Figure 25A:
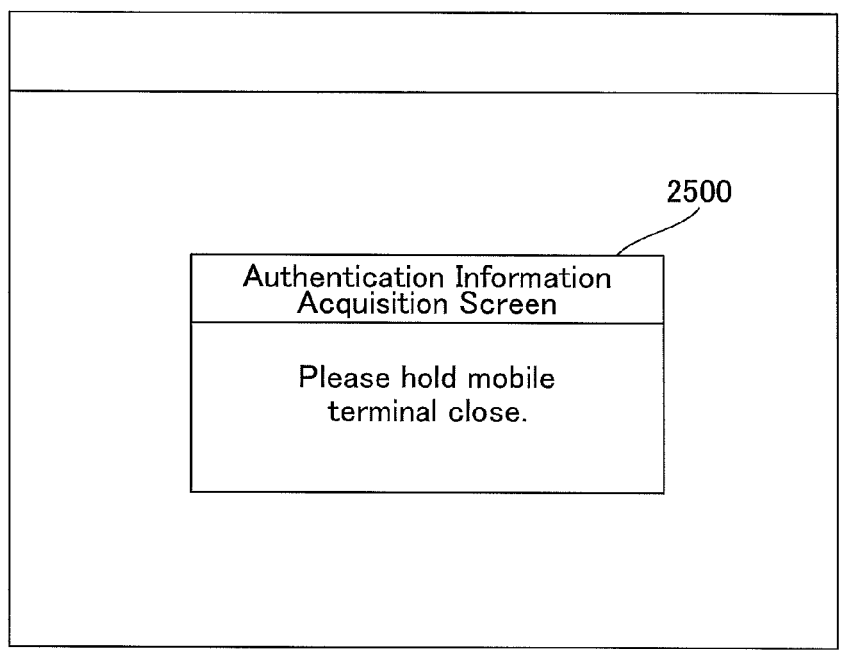
FIGS. 25A and 25B illustrate other examples of a display screen that may be displayed at the printer apparatus.

Also, in response to the selection of online cooperation, in step S2115, the display control unit 601 displays an authentication information acquisition screen on the display unit. FIG. 25A illustrates an exemplary authentication information acquisition screen 2500.

As illustrated in FIG. 25A, the authentication information acquisition screen 2500 includes a message prompting the user 701 to establish near field communication between the printer apparatus 1420 and the mobile terminal 160.

In response to the display of the authentication information acquisition screen 2500 on the display unit, the user 701 holds the mobile terminal 160 close to the printer apparatus 1420 (step S712). Note that the processes of steps S713-S719 of FIG. 21 may be substantially identical to the processes of steps S713-S719 of FIG. 7, and as such descriptions thereof are omitted.

Figure 25B:
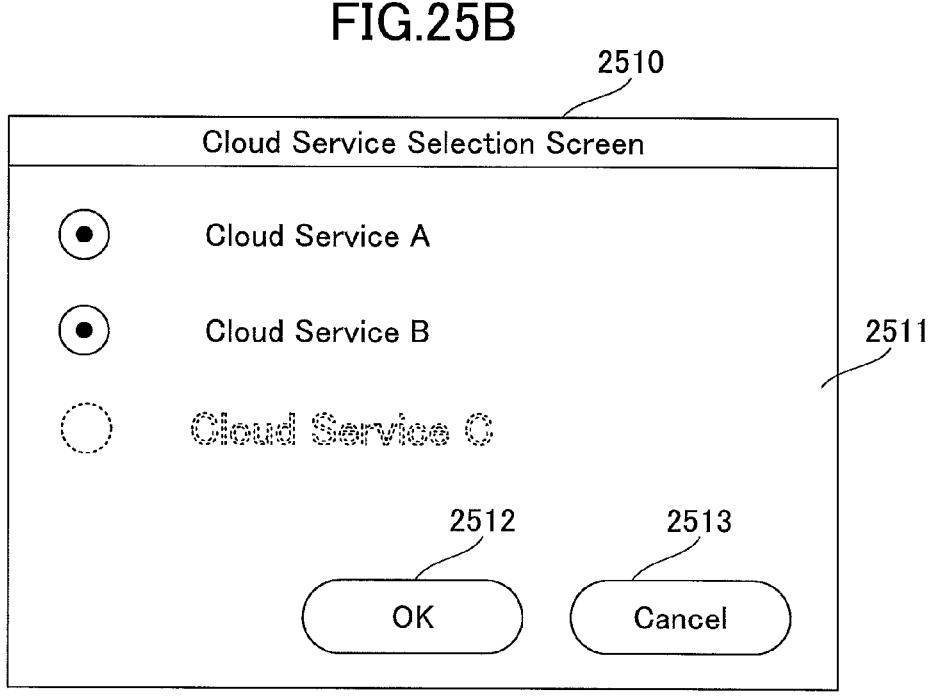

In step S2116, the display control unit 601 displays a cloud service selection screen on the display unit. FIG. 25B illustrates an exemplary cloud service selection screen 2510. As illustrated in FIG. 25B, the cloud service selection screen 2510, includes a display area 2511 displaying information indicating the cloud services for which acquisition requests for authentication information have been made in steps S713, S715, and S717.

Note that in the display area 2511, information indicating a cloud service for which authentication information has been acquired, and information indicating a cloud service for which authentication information could not be acquired are displayed in different display modes.

In steps S714 and S716, authentication information for using the cloud service A and authentication information for using the cloud service B were acquired. Thus, in the cloud service selection screen 2510, information indicating the cloud services A and B are displayed in a selectable display mode such that the cloud services A and B may be selected as an acquisition source of print data. On the other hand, in step S718, the authentication information for using the cloud service C could not be acquired. Thus, the cloud service selection screen 2510 displays the information indicating the cloud service C in a non-selectable display mode such that the cloud service C cannot be selected as an acquisition source of print data.

In step S2201 of FIG. 22, the user 701 may select one or more cloud services from the cloud service selection screen 2510 (by checking the selection fields associated with the cloud services and pressing an OK button 2512), and in turn, the process proceeds to step S2202.

In step S2202, the authentication information acquisition unit 603 conveys information indicating the cloud service selected in step S2201 to the workflow execution instruction unit 2002. Further, the authentication information acquisition unit 603 conveys the corresponding authentication information for using the selected cloud services (authentication information acquired in steps S714 and S716) to the workflow execution instruction unit 2002. Note that if a cancel button 2513 in the cloud service selection screen 2510 is pressed, the process returns to step S2115.

In step S2203, the workflow execution instruction unit 2002 sends a print data list acquisition request including the information indicating the selected cloud services and their authentication information to the print server 1410.

The print server 1410 that receives the print data list acquisition request executes a list acquisition process in the cloud (step S2204). Note that the list acquisition process in the cloud (step S2204) is described in detail above with reference to FIG. 18B.

After executing the list acquisition process in the cloud, in step S2205, the print server 1410 transmits the print data list acquisition request to the cloud server 130. In step S2206, the cloud server 130 that receives the print data list acquisition request transmits a print data list to the print server 1410.

In step S2207, the print server 1410 sends to the workflow execution instruction unit 2002 the print data list received from the cloud server 130 together with a corresponding display screen.

In step S2208, the workflow execution instruction unit 2002 conveys the print data list received from the print server 1410 together with the display screen to the display control unit 601 and directs the display control unit 601 to display the print data list.

Figure 26:
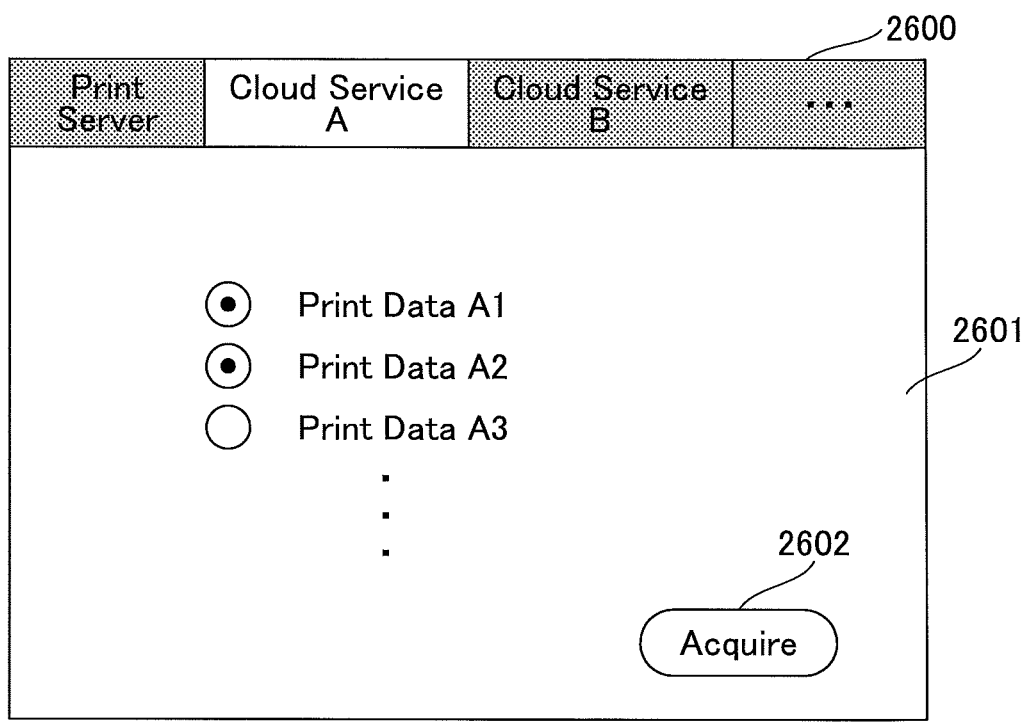
FIG. 26 illustrates another example of a display screen that may be displayed at the printer apparatus.

In step S2209, the display control unit 601 displays the print data list screen on the display unit. FIG. 26 illustrates an exemplary print data list screen 2600.

As illustrated in FIG. 26, the print data list screen 2600 includes tabs for displaying the print data list received from the print server 1410, the print data list received from the cloud server 130 (cloud service A), and the print data list received from the cloud server 140 (cloud service B).

FIG. 26 illustrates an exemplary case in which the tab for displaying the print data list received from the cloud server 130 has been selected. As illustrated in FIG. 26, the print data list screen 2600 includes a display area 2601 displaying a list of print data stored in the cloud server 130 and a selection field for selecting one of the print data being listed.

In step S2210, the user 701 selects a desired print data (by checking the selection field associated with the print data and pressing an acquire button 2602), and in turn, the process proceeds to step S2211.

In step S2211, the display control unit 601 conveys the print data acquisition request including the information indicating the print data selected in step S2210 and corresponding authentication information to the workflow execution instruction unit 2002. In step S2212, the workflow execution instruction unit 2002 sends the print data acquisition request to the print server 1410.

In step S2213, the print server 1410 that receives the print data acquisition request executes a print data acquisition process. Note that the print data acquisition process of step S2213 is described in detail above with reference to FIG. 19B.

After the print data acquisition process of step S2213 is executed, in step S2214, the print server 1410 sends the print data acquisition request to the cloud server 130. In step S2215, the cloud server 130 sends print data to the print server 1410. In step S2216, the print server 1410 sends the print data acquired from the cloud server 130 to the workflow execution instruction unit 2002.

In step S2217, the user 701 presses the start button, and in turn, in step S2218, the print control unit 2001 reads from the workflow execution instruction unit 2002 the print data sent from the print server 1410. Note that the print data sent from the print server 1410 includes the print data sent in step S2113 and the print data sent in step S2216.

In step S2219, the workflow execution instruction unit 2002 conveys the print data to the print control unit 2001. In step S2220, the print control unit 2001 executes a print process based on the acquired print data.

<Summary>

As can be appreciated from the above descriptions, the following features are implemented in the printer apparatus according to the present embodiment.

When a workflow file selected by a user includes a print process to be executed with respect to print data provided by a cloud service, the printer apparatus is configured to acquire authentication information for using the cloud service from a mobile terminal of the user.

The printer apparatus is configured to acquire the authentication information from the mobile terminal of the user by establishing near field communication with the mobile terminal of the user.

According to an aspect of the present embodiment, even in a case of executing a workflow file that includes a print process to be executed with respect to print data provided by a cloud service, the user can simply hold his/her mobile terminal close to the printer apparatus to provide authentication information for using the cloud service.

By utilizing authentication information for using a cloud service that is stored in the mobile terminal 160 upon executing a print data acquisition process at the print server 1410 as described above, the user may be relieved of the burden of having to manually input the authentication information to the printer apparatus 1420. As a result, user convenience may be improved in the print system in a case where an acquisition source of print data corresponds to a cloud service.

[Sixth Embodiment]

In the fifth embodiment described above, all the authentication information for using a cloud service is acquired from the mobile terminal 160. However, the present invention is not limited thereto. For example, an authentication server may be separately provided and the printer apparatus 1420 may be configured to acquire a part of the authentication information from a registered authentication information storage unit of the authentication server. That is, the second embodiment can be applied to the fifth embodiment.

Also, the printer apparatus 1420 according to the fifth embodiment is merely one illustrative example of an image processing apparatus that is configured to acquire data specified by a user and instruct the execution of a print process with respect to the acquired data. The present invention is not limited to using the printer apparatus 1420, but may use other various types of image processing apparatuses or information processing apparatuses including a client terminal such as a user PC and the like. For example, an information processing apparatus such as a client terminal or an image processing apparatus may be configured to instruct the execution of a print process.

Also, in the fifth embodiment, a plug-in for acquiring a print data list and a plug-in for acquiring print data are provided. However, the present invention is not limited to such an arrangement, and in some embodiments, the plug-in for acquiring a print data list may be omitted, for example. In this case, when the plug-in for acquiring print data acquires print data from the print server 1410 or the cloud server 130, it may be configured to transmit thumbnail images of the print data to the printer apparatus 1420 so that the user 701 may select the desired print data.

Also, in the embodiments described above, the workflow execution program 111 and the workflow storage unit 112 are arranged in the delivery server 110 or the print server 1410. However, the present invention is not limited to such an arrangement. For example, the workflow execution program 111 and the workflow storage unit 112 may be arranged in the scanner apparatus 120 or the printer apparatus 1420.

Also, although the delivery server 110 and the print server 1410 are separately illustrated in the embodiments described above, the present invention is not limited to these embodiments. For example, in some embodiments, the functions implemented by the delivery server 110 and the functions implemented by the print server 1410 may be implemented by a single server apparatus. Also, the functions implemented by the delivery server 110 and the functions implemented by the print server 1410 may be implemented by a plurality of server apparatuses constituting a server system, for example.

Note that in a case where the functions implemented by the delivery server 110 and the functions implemented by the print server 1410 are implemented by a server apparatus or a server system, the server apparatus or the server system is configured to execute a delivery process with respect to a scanned image and an acquisition process with respect to print data based on a workflow. That is, the server apparatus or the server system is configured to implement a function of executing a communication process including transmitting and receiving data to/from a cloud server based on a workflow.

Also, although the scanner apparatus 120 and the printer apparatus 1420 are separately illustrated in the embodiments described above, the present invention is not limited to these embodiments. For example, in some embodiments, the functions implemented by the scanner apparatus 120 and the functions implemented by the printer apparatus 1420 may be implemented by a single image processing apparatus.

Also, although each of the cloud servers 130-150 providing storage services is configured by a single server apparatus (service providing apparatus) in the embodiments described above, the present invention is not limited to these embodiments. For example, one or more of the cloud servers 130-150 may be configured by a server system including a plurality of server apparatuses (service providing apparatuses).

Although the present invention has been described above with reference to certain preferred embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU and the RAM may operate as a physical memory or a primary memory of the apparatus, while the HDD may operate as a secondary memory of the apparatus.

The present application is based on and claims the benefit of priority of Japanese Patent Application No. 2014-055396 filed on Mar. 18, 2014 and Japanese Patent Application No. 2015-004250 filed on Jan. 13, 2015, the entire contents of which are hereby incorporated by reference.

What is claimed is:

1. An information processing apparatus comprising:
a processor, in communication with a memory, executing steps of
selecting a workflow with respect to data;
acquiring authentication information used for accessing a storage service from a terminal which can access the storage service; and
instructing an execution of a communication process of exchanging the data with the storage service using the authentication information when the workflow selected includes the communication process.

2. The information processing apparatus as claimed in claim 1, wherein the processor further executes steps of
identifying one or more of the storage services that can be used by the terminal; and
selecting at least one storage service from the one or more of the storage services identified by the identifying.

3. The information processing apparatus as claimed in claim 2, wherein the identifying transmits a request for authentication information of one or more predetermined storage services, and identifies the storage service that can be used by the terminal and a storage service that cannot be used by the terminal based on a response to the request for authentication information from the terminal.

4. The information processing apparatus as claimed in claim 3, wherein the processor further executes steps of
displaying the storage service that can be used by the terminal and the storage service that cannot be used by the terminal in different display modes.

5. The information processing apparatus as claimed in claim 4, wherein the acquiring acquires the authentication information from the terminal through near field communication.

6. The information processing apparatus as claimed in claim 3, wherein the acquiring acquires the authentication information from the terminal through near field communication.

7. The information processing apparatus as claimed in claim 2, wherein the acquiring acquires the authentication information from the terminal through near field communication.

8. The information processing apparatus as claimed in claim 2, wherein
in a case where the selected workflow includes a delivery process of delivering the data to the storage service, the instructing instructs an execution of the delivery process using the authentication information acquired by the acquiring.

9. The information processing apparatus as claimed in claim 8, wherein the instructing instructs the execution of the delivery process to deliver the data to the selected storage service as a delivery destination of the data.

10. The information processing apparatus as claimed in claim 8, wherein the identifying transmits to the terminal a request for authentication information of the storage service that can be a delivery destination of the data in a case where the delivery process included in the selected workflow is executed.

11. The information processing apparatus as claimed in claim 1, wherein the acquiring acquires the authentication information from the terminal through near field communication.

12. The information processing apparatus as claimed in claim 2, wherein
in a case where the selected workflow includes a print process of acquiring the data that is provided by the storage service and outputting the acquired data to a printer apparatus, the instructing instructs an execution of the print process using the authentication information acquired by the acquiring.

13. The information processing apparatus as claimed in claim 12, wherein the instructing instructs the execution of the print process to acquire the data from the selected storage service as an acquisition source of the data.

14. The information processing apparatus as claimed in claim 12, wherein the identifying transmits to the terminal a request for authentication information of the storage service that can be an acquisition source of the data in a case where the print process included in the selected workflow is executed.

15. An information processing system comprising:
an information processing apparatus operated by a user;
at least one service providing apparatus configured to provide a storage service;
a mobile terminal including an access function for accessing the storage service;
a server apparatus including a workflow for executing at least one process with respect to data; and
a processor, in communication with a memory, executing steps of
selecting the workflow with respect to the data;
acquiring authentication information used for accessing the storage service from the mobile terminal which can access the storage service; and
instructing an execution of a communication process of exchanging the data with the service providing apparatus using the authentication information when the workflow selected includes the communication process.

16. An information processing method implemented by an information processing system including an information processing apparatus operated by a user, at least one service providing apparatus that provides a storage service, a mobile terminal including an access function for accessing the storage service, a server apparatus including a workflow for executing at least one process with respect to data, and a processor, in communication with a memory, for executing the information processing method comprising:

a selection step of selecting the workflow with respect to the data;

an acquisition step of acquiring authentication information used for accessing the storage service from the mobile terminal which can access the storage service; and an instruction step of instructing an execution of a communication process of exchanging the data with the service providing apparatus using the authentication information when the workflow selected includes the communication process.

\* \* \* \* \*